US012405677B2

United States Patent
Aurongzeb et al.

(10) Patent No.: US 12,405,677 B2
(45) Date of Patent: Sep. 2, 2025

(54) METHOD OF ASSEMBLING AND SUSTAINABLE SYSTEM FOR A USER-REPAIRABLE MOUSE

(71) Applicant: Dell Products, LP, Round Rock, TX (US)

(72) Inventors: Deeder M. Aurongzeb, Austin, TX (US); Weijong Sheu, Austin, TX (US); Peng Lip Goh, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 18/386,417

(22) Filed: Nov. 2, 2023

(65) Prior Publication Data

US 2025/0147600 A1  May 8, 2025

(51) Int. Cl.
 *G06F 3/0354* (2013.01)
 *G06F 3/03* (2006.01)
 *G06F 3/038* (2013.01)

(52) U.S. Cl.
 CPC ........ *G06F 3/03543* (2013.01); *G06F 3/0304* (2013.01); *G06F 3/0383* (2013.01); *G06F 2203/0384* (2013.01)

(58) Field of Classification Search
 CPC .. G06F 3/03543; G06F 3/0304; G06F 3/0383; G06F 2203/0384
 See application file for complete search history.

(56) References Cited

U.S. PATENT DOCUMENTS

| 8,308,387 | B2 | 11/2012 | King | |
|---|---|---|---|---|
| 9,798,387 | B2 | 10/2017 | Joseph | |
| 2005/0179652 | A1 | 8/2005 | Ludwig | |
| 2008/0111792 | A1* | 5/2008 | Roberts | G06F 3/03543 345/163 |
| 2012/0092255 | A1 | 4/2012 | Lin | |
| 2015/0138093 | A1* | 5/2015 | Young | G06F 3/0312 345/166 |
| 2018/0275778 | A1* | 9/2018 | Zhang | G06F 3/0317 |
| 2019/0132998 | A1* | 5/2019 | Yoshida | H05K 7/20154 |
| 2021/0124433 | A1* | 4/2021 | Bustamante | G06F 3/039 |

* cited by examiner

*Primary Examiner* — Amit Chatly
(74) *Attorney, Agent, or Firm* — Prol Intellectual Property Law, PLLC; H. Kenneth Prol

(57) ABSTRACT

A user-repairable mouse for an information handling system comprising a board-to-board connector comprising a sensor printed circuit board (PCB) connector first side bridged to a mouse main PCB connector and a user-replaceable mouse bottom cover having a user-replaceable mouse scroll wheel and scroll wheel encoder operatively coupled to the mouse main PCB having a mouse controller. The user-replaceable mouse bottom cover has a replaceable mouse sensor aperture to receive a user-replaceable mouse sensor assembly that includes an optical sensor operatively coupled to a sensor PCB and an optical sensor lens, wherein the sensor PCB includes sensor board side connector contacts for removable coupling to a first side of a sensor PCB connector on the board-to-board connector, and a user-replaceable mouse top cover operatively coupled with the user-replaceable mouse bottom cover.

20 Claims, 15 Drawing Sheets

EXPLODED PERSPECTIVE VIEW

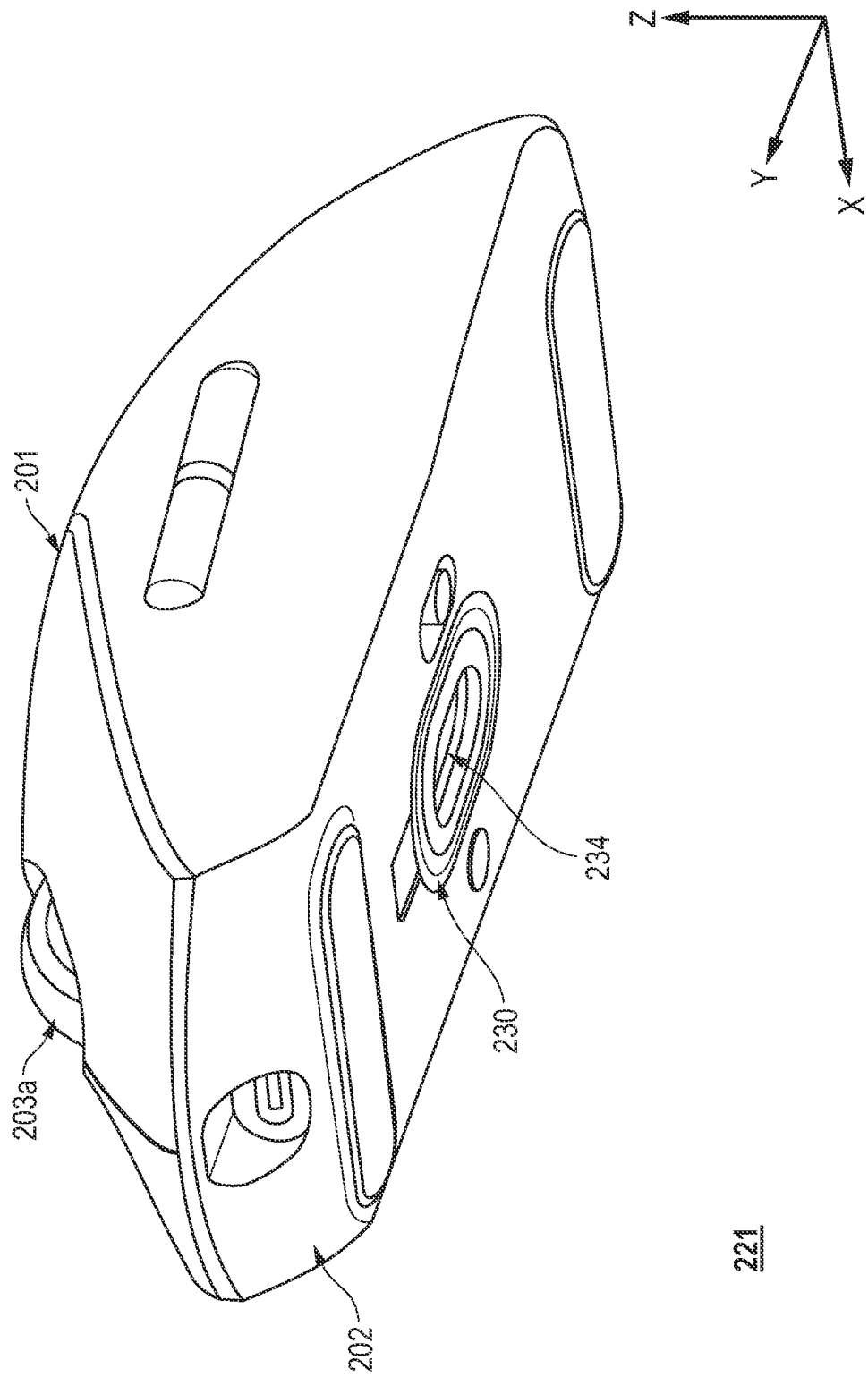

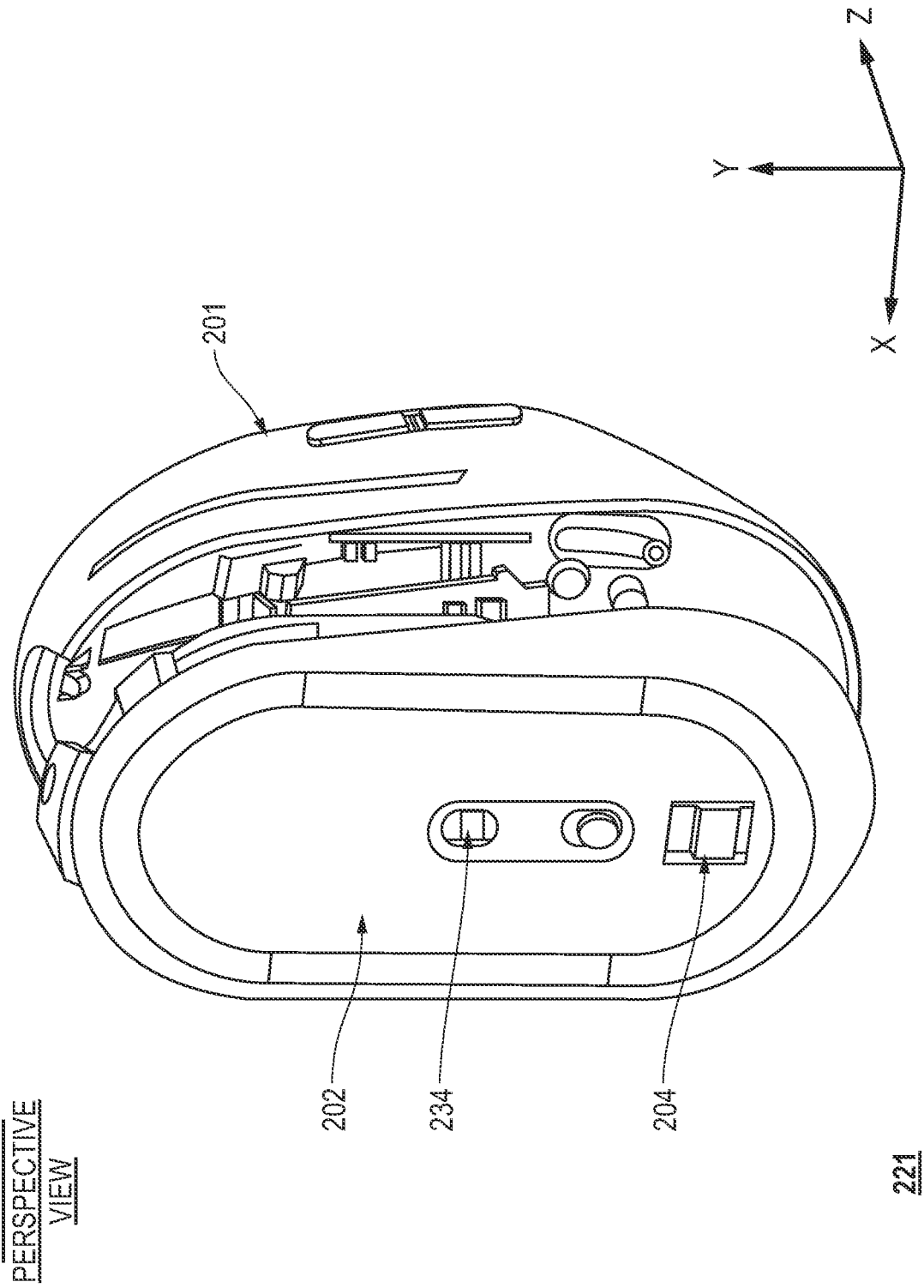

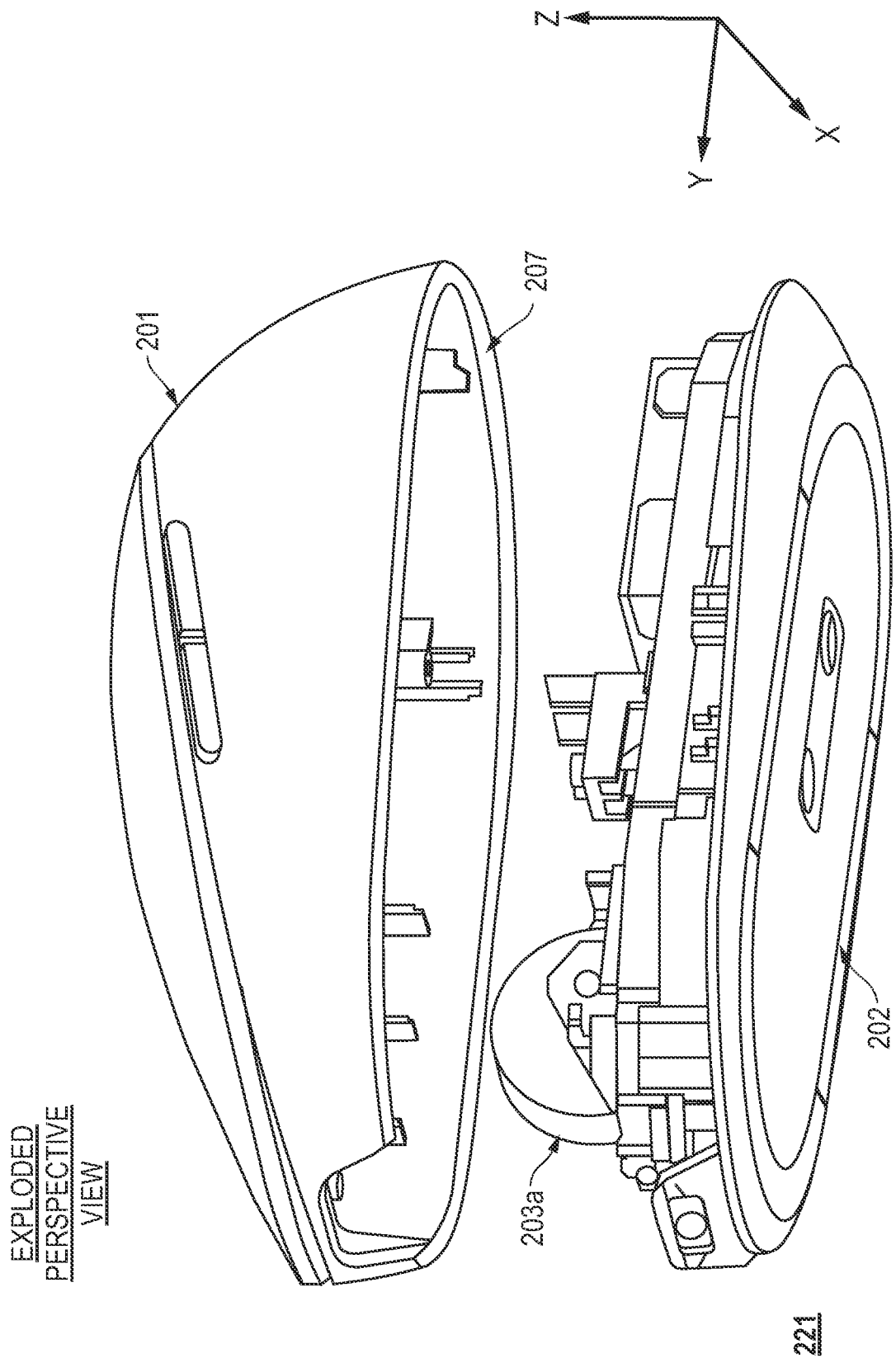

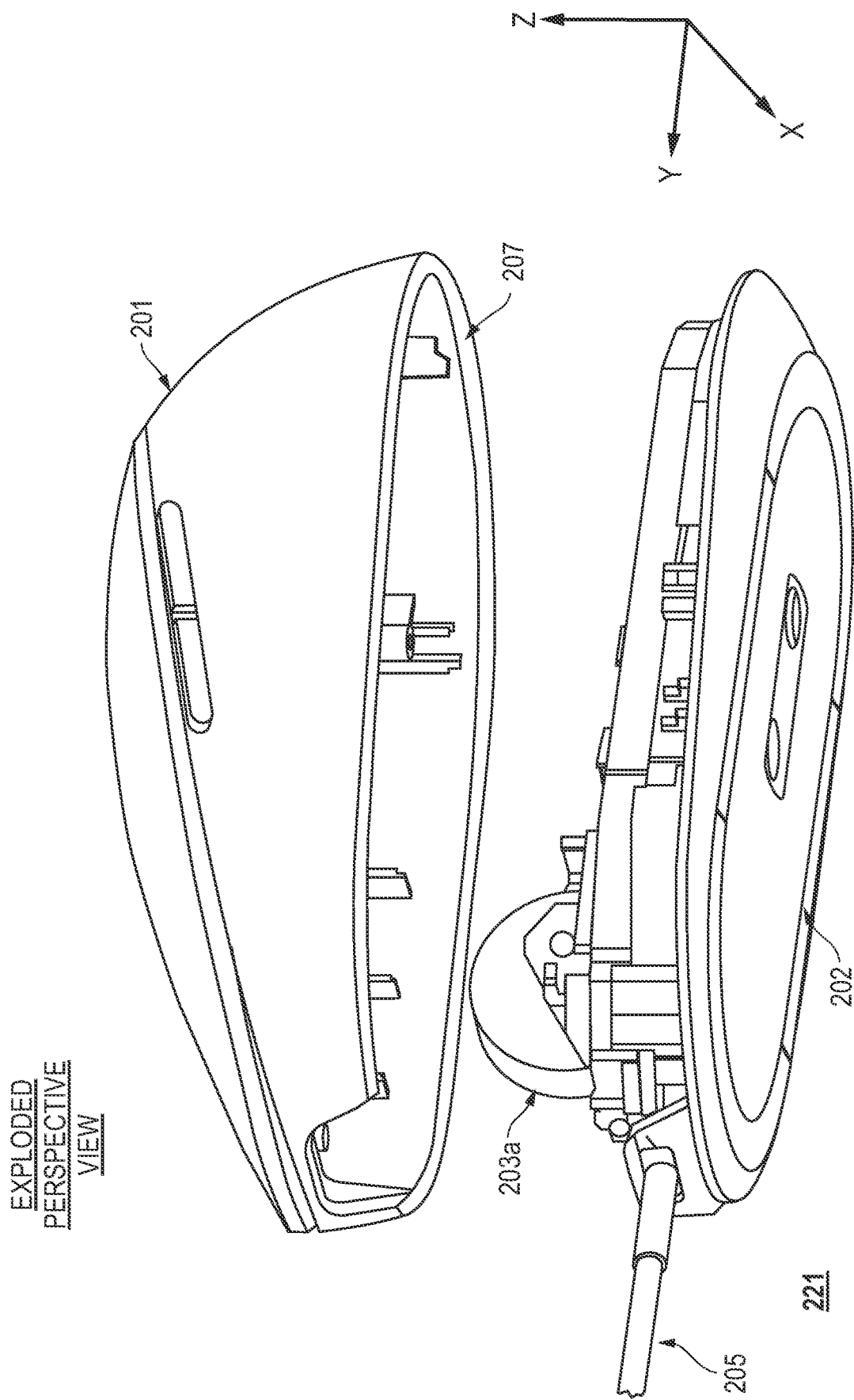

EXPLODED PERSPECTIVE VIEW

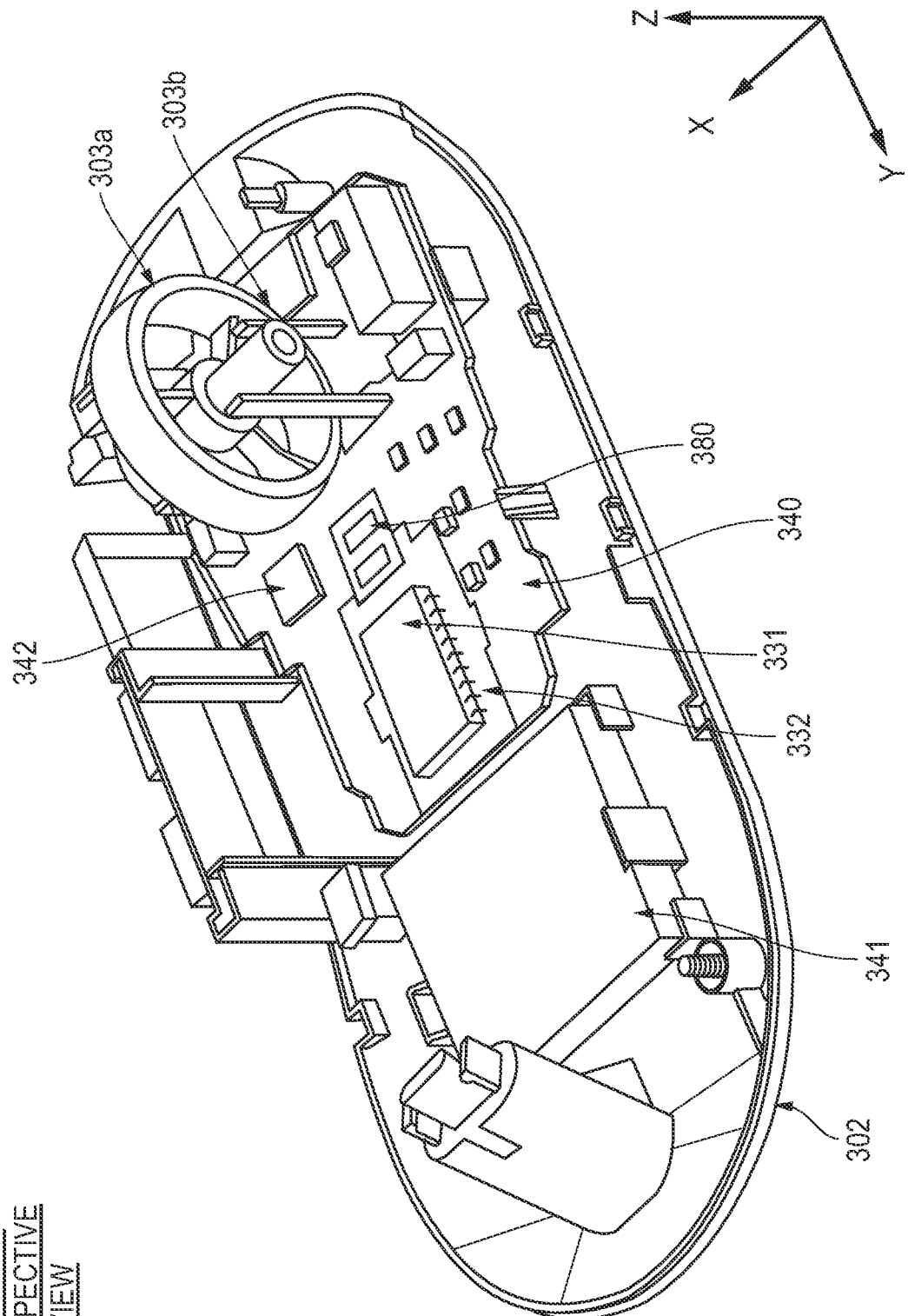

BOTTOM PERSPECTIVE VIEW

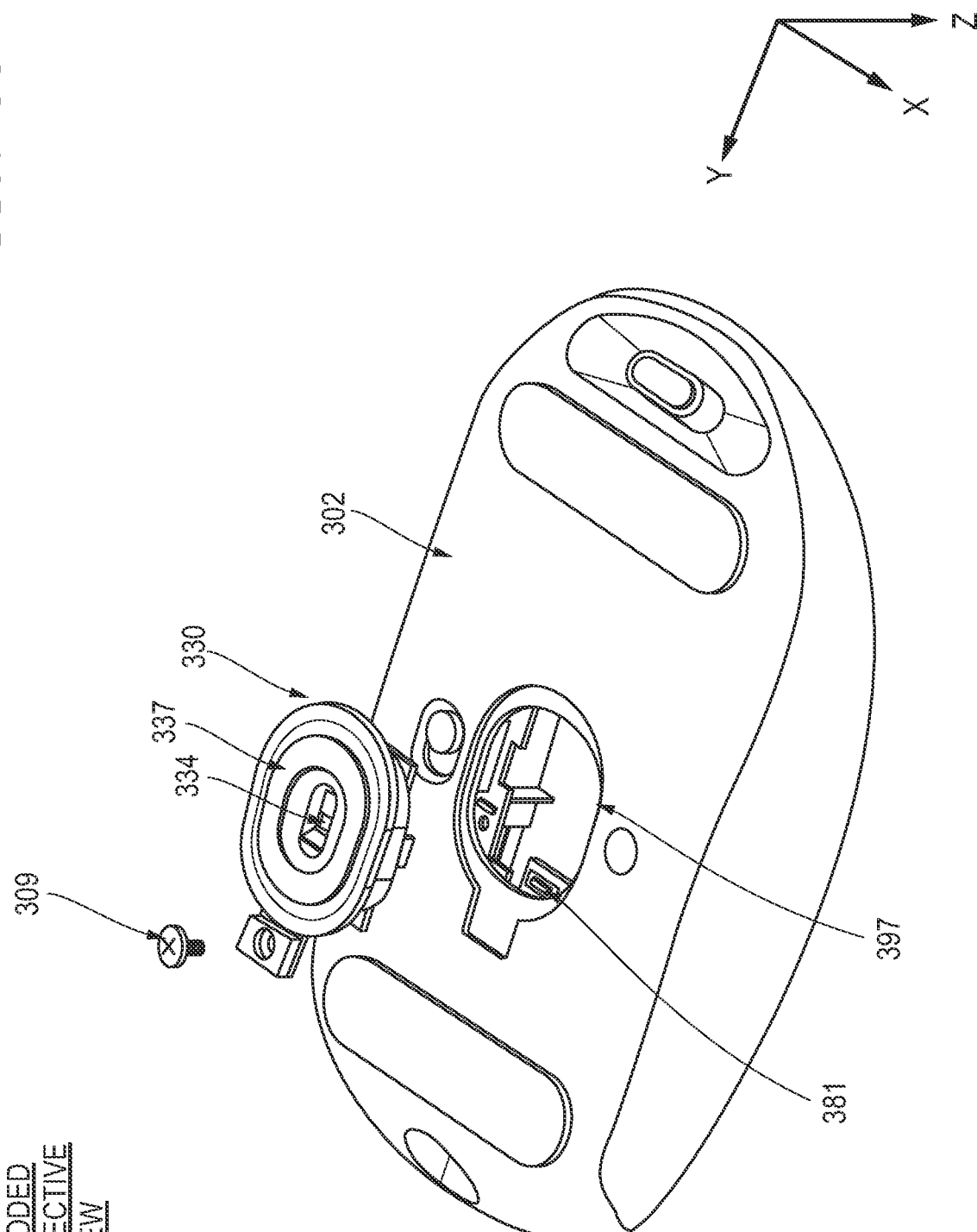

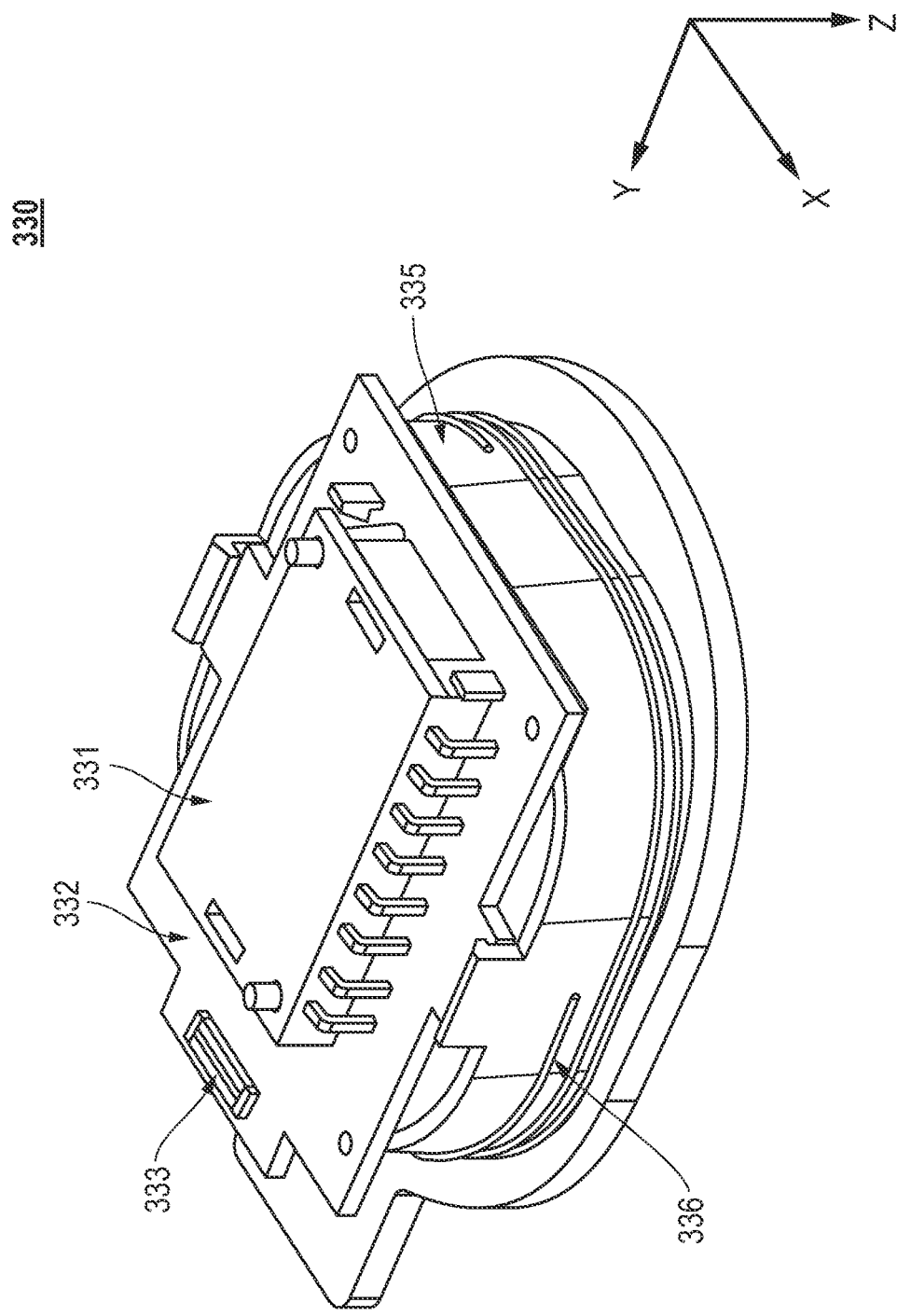

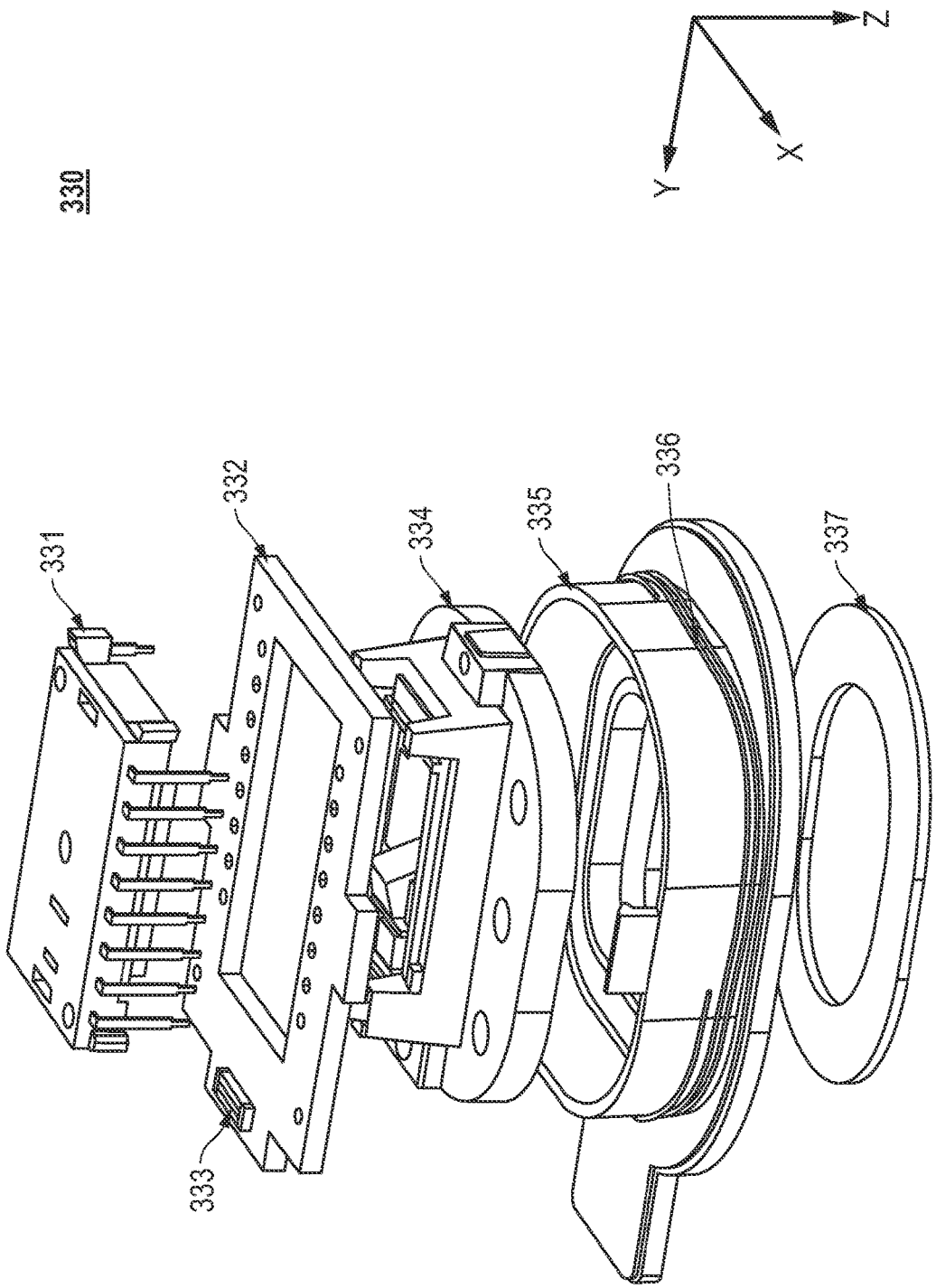

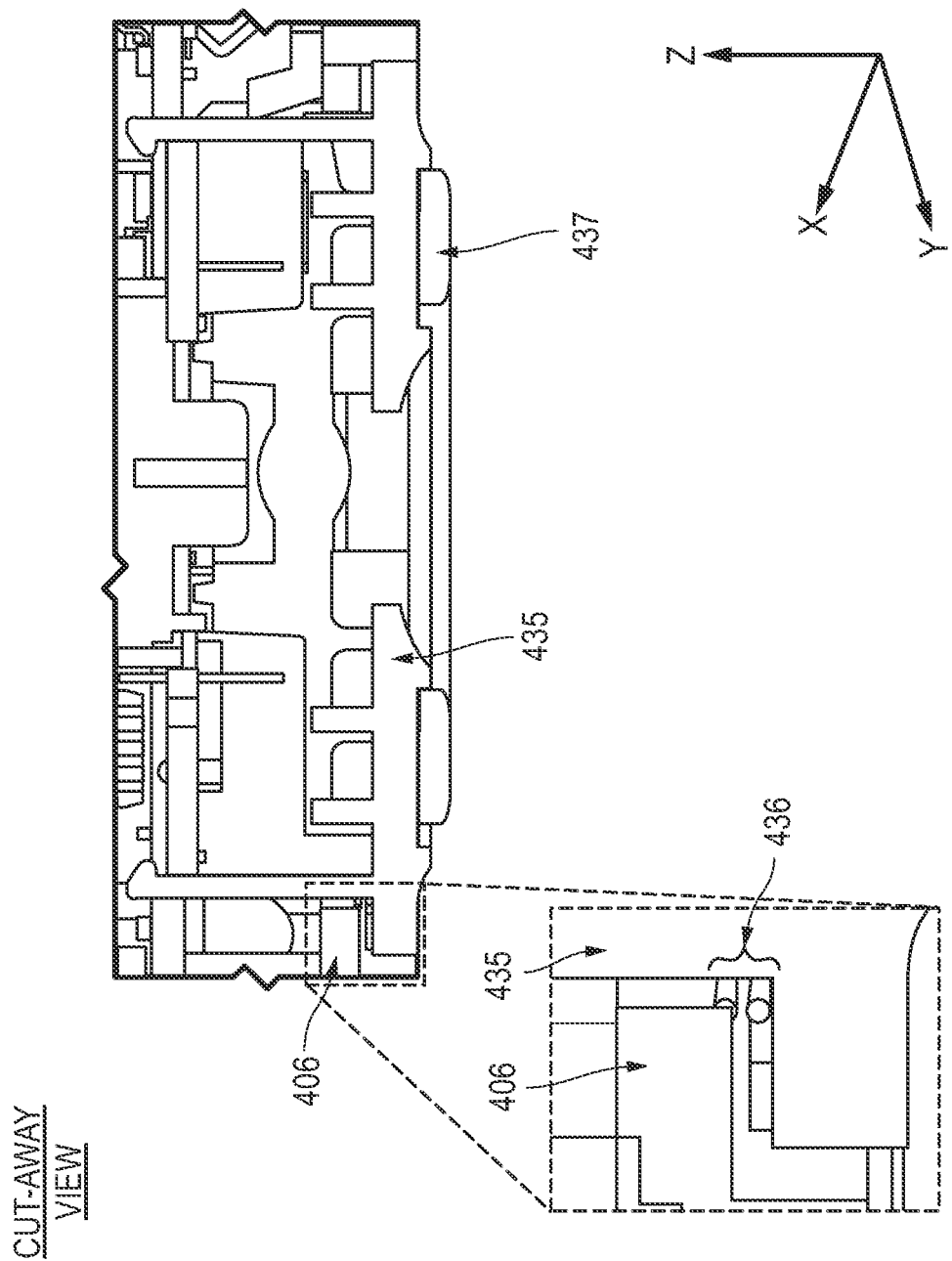

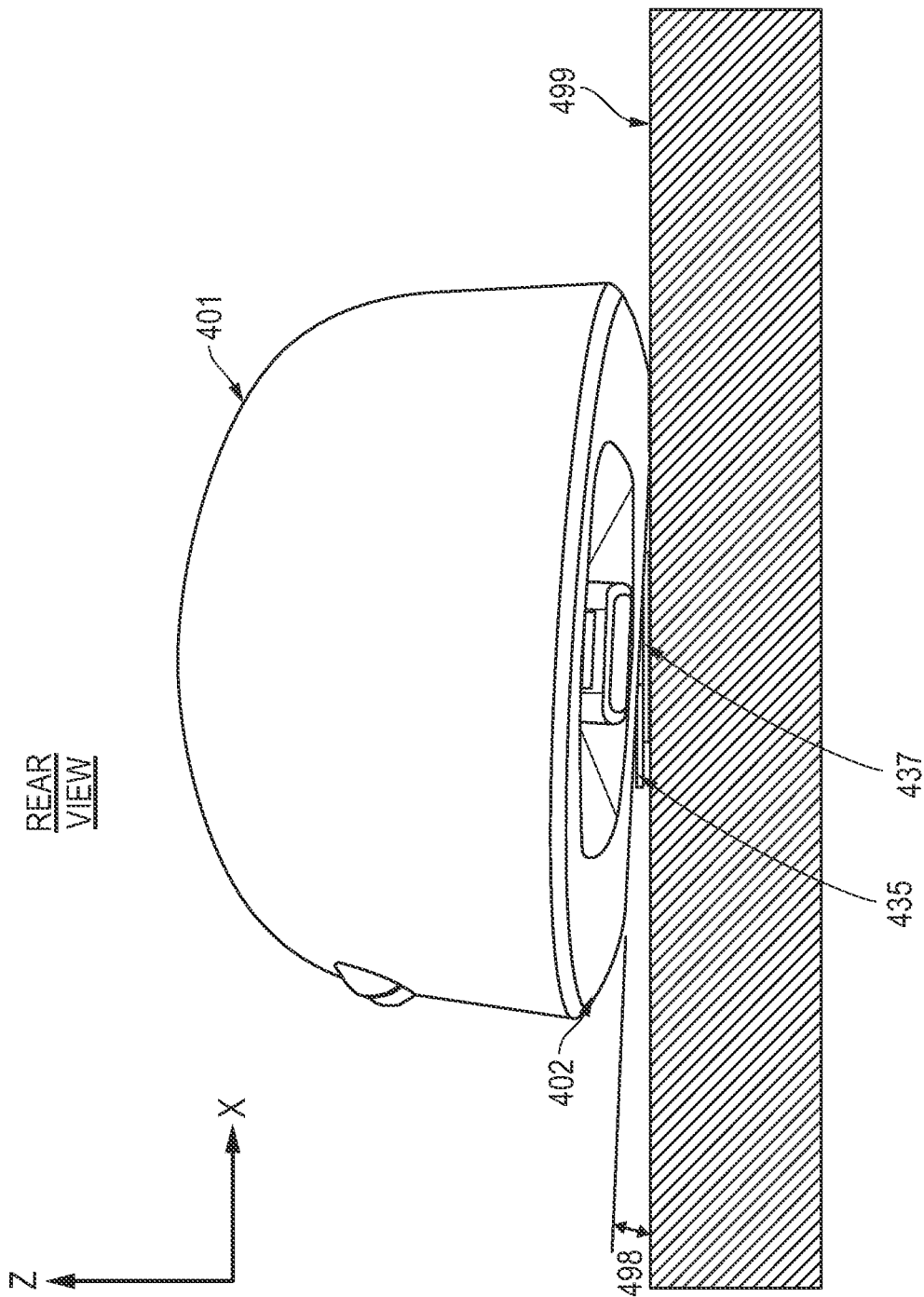

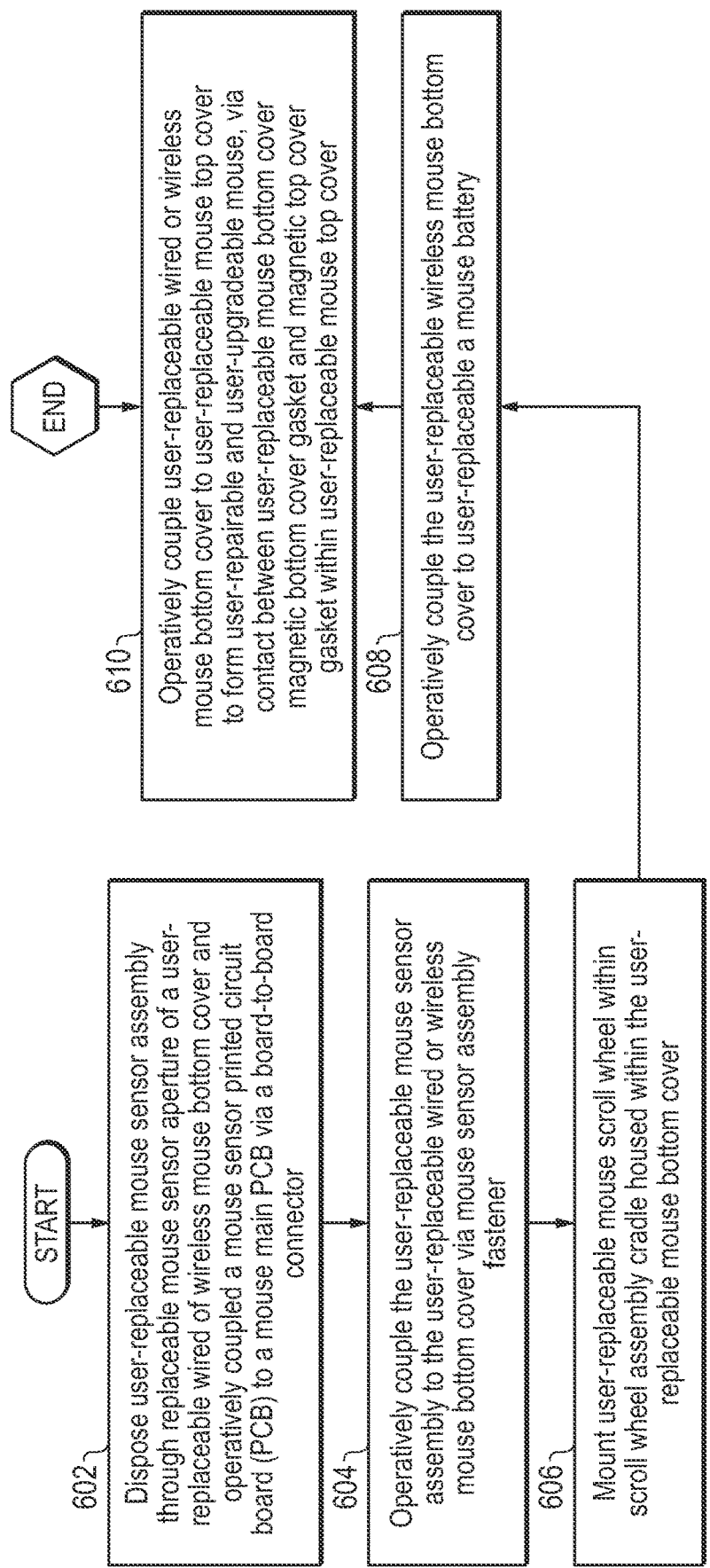

METHOD OF ASSEMBLING AND SUSTAINABLE SYSTEM FOR A USER-REPAIRABLE MOUSE

FIELD OF THE DISCLOSURE

The present disclosure generally relates to assembly of a mouse for an information handling system. More specifically, the present disclosure relates to the sustainable assembly of a wired or wireless mouse with modular and user-replaceable components for decreasing waste caused by disposal of an entire mouse assembly due to a user's wish to upgrade or repair individual components, such as a sensor, cover, or scroll wheel.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include one or more connectors for peripheral input/output devices that may also include a mouse, for example.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 2A is a graphical diagram illustrating a perspective view of a user-repairable mouse according to an embodiment of the present disclosure;

FIG. 2B is a graphical diagram illustrating an exploded perspective view of a releasable fastener for ease of disassembly of a user-repairable mouse according to an embodiment of the present disclosure.

FIG. 2C is a graphical diagram illustrating an exploded perspective view of a wireless user-repairable mouse according to an embodiment of the present disclosure;

FIG. 2D is a graphical diagram illustrating an exploded perspective view of a wired user-repairable mouse according to an embodiment of the present disclosure;

FIG. 3A is a graphical diagram illustrating a perspective view of a user-repairable mouse bottom cover according to an embodiment of the present disclosure;

FIG. 3C is a graphical diagram illustrating an exploded perspective view of a user-replaceable mouse bottom cover with a user-replaceable mouse sensor assembly according to an embodiment of the present disclosure;

FIG. 3D is a graphical diagram illustrating a perspective view of a user-replaceable mouse sensor assembly according to an embodiment of the present disclosure;

FIG. 3E is a graphical diagram illustrating an exploded perspective view of a user-replaceable mouse sensor assembly according to an embodiment of the present disclosure;

FIG. 4A is a graphical diagram illustrating cut-away view of a user-replaceable mouse sensor assembly with a surface leveling spring according to an embodiment of the present disclosure;

FIG. 4B is a graphical diagram illustrating rear view of a surface leveling spring to bring a mouse sensor level with a track surface during tilting of the mouse by the user according to an embodiment of the present disclosure;

FIG. 6 is a flow diagram illustrating a method of assembling a plurality of user-replaceable, modular components to form a user-repairable mouse according to an embodiment of the present disclosure.

The use of the same reference symbols in different drawings may indicate similar or identical items.

DETAILED DESCRIPTION OF THE DRAWINGS

Figure 1:
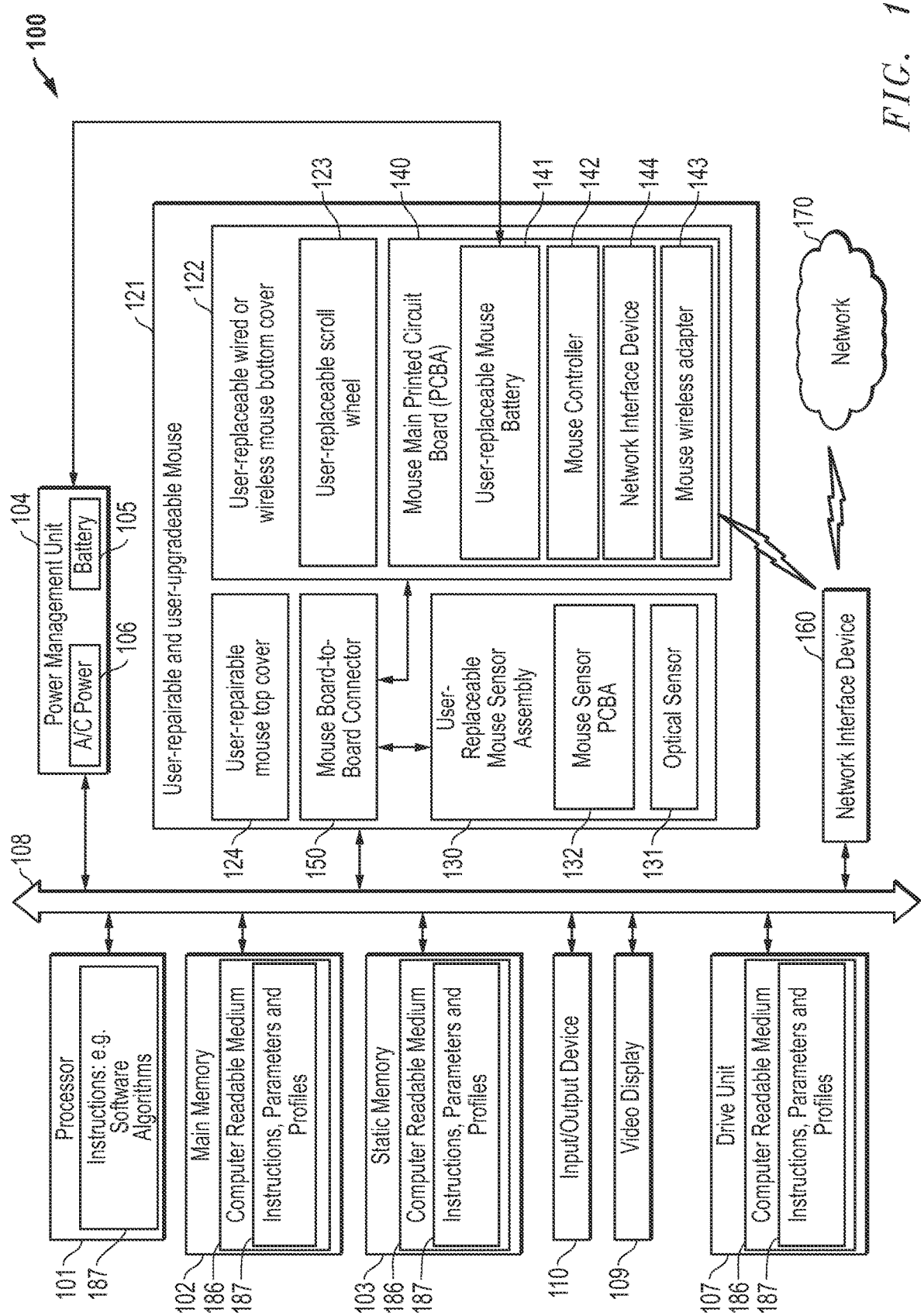
FIG. 1 is a block diagram illustrating an information handling system operatively coupled to a user-repairable mouse according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Mouse assemblies for information handling systems may include multiple hardware components that wear, break, or become ready for upgrade at different times than other of such components. For example, mouse assemblies in existing systems may include the scroll wheel, optical sensor, power source, connectivity components such as wireless radios and wireless adapters, network interface devices or various input/output connectors, and top cover upon which a user places a hand. Any one of these components in existing systems may break, wear down, or otherwise require replacement while the other components of the mouse assembly remain fully functional. In addition, a user or information technology (IT) manager may wish to upgrade or replace any one of these hardware components individually, for better performance, to address changing connectivity needs, such as switching from a wired connection to a wireless connection or vice versa, or for aesthetic reasons, such as to replace a worn top cover. In existing systems, in order to perform any one of these changes to a single one of such components, the entire mouse assembly may be replaced, despite remaining usefulness of various hardware components in the mice. This may result in undo waste and environmental impacts.

The user-repairable mouse in embodiments of the present disclosure address these issues by providing a plurality of interchangeable modular-components that may be easily disassembled with minimal tools or no tools for repair. These interchangeable modular-components may also be combined in a plurality of ways to provide various power and connectivity functionalities and aesthetics. For example, a user-repairable mouse in embodiments of the present disclosure may be assembled by operatively coupling one of a plurality of available types of scroll wheel, user-replaceable mouse top cover, user-replaceable mouse sensor assembly, and one of a plurality of different types of user-replaceable mouse bottom covers, each providing varying combinations of connectivity capabilities and power sources. In addition, a user-replaceable mouse sensor assembly may further include a surface-leveling spring for keeping the bottom surface of the user-replaceable mouse sensor assembly level with a track surface when the user rapidly swipes in one direction, which may cause the body of the user-repairable mouse to tilt. Such automatic leveling in embodiments herein may decrease erroneous sensor readings resulting from the mouse sensor tilting with the body of the mouse, as occurs in existing systems.

A user who wishes to continue to use most of these components, such as the user-replaceable mouse sensor assembly, scroll wheel, user-replaceable mouse top cover, user-replaceable mouse battery, or wired or wireless user-replaceable mouse bottom cover, but would like to upgrade, replace, or adjust functionality of only one of these components may exchange the undesirable or broken component with a new or upgraded version of that component. The user in such a case may make such an exchange without having to replace and dispose of the remaining, currently functional components with which the user is satisfied. In such a way, assembly of the user-repairable mouse may decrease waste associated with upgrading or replacing mice.

FIG. 1 illustrates an information handling system 100 according to several aspects of the present disclosure. In various embodiments described herein, a user-repairable mouse 121 may be a wired or wireless mouse that is operatively coupled to the information handling system 100. Various damaged or upgradeable components of the user-repairable mouse 121 may be removable and replaceable with respect to other functioning components of the user-repairable mouse 121 and with respect to the information handling system 100 or across plural other wired or wireless mice that may be part of an enterprise. This may allow for replacement of damaged or upgradeable components of the user-repairable mouse 121 among a group of wired and wireless mice, rather than replacement of the entire wired or wireless mouse. Such modularity may result in decreased waste and positive environmental impacts and longer life of a wired or wireless user-repairable mouse 121.

The user-repairable mouse 121 in an embodiment may comprise a plurality of interchangeable modular components that may be easily disassembled with minimal tools or no tools for repair. For example, the user-repairable mouse 121 in an embodiment may include a user-replaceable mouse sensor assembly 130, a user-replaceable wired or wireless mouse bottom cover 122 housing user-replaceable scroll wheel 123 and a user-replaceable mouse battery 141. The user-replaceable mouse battery 141 may be a rechargeable battery or a dry cell battery in various embodiments. In an embodiment, the user-replaceable mouse battery 141, which may be included within a wireless version of the wired or wireless user-replaceable mouse bottom cover 122, may be operatively coupled to a mouse main printed circuit board (PCB) 140 within the wired or wireless user-repairable mouse bottom cover 122, to which a mouse controller 142 and a mouse wireless adapter 143 and network interface device 144 may also be operatively coupled. The wired version of the user-replaceable mouse bottom cover 122 may omit the user-replaceable mouse battery 141 and the mouse wireless adapter 143 in an embodiment. In both the wired and wireless versions for the user-repairable mouse 121, the mouse main PCB 140 may be operatively coupled to a mouse sensor PCB 132 of a replaceable mouse sensor assembly 130 via a mouse board-to-board connector 150. Mouse board-to-board connector 150 may be a floating board-to-board connector to bridge between the mouse sensor PCB 132 and mouse main PCB 140 to allow for movement between them during mouse operation as well as for easy connection/disconnection of power and data coupling during removal and replacement of the user replaceable mouse sensor assembly 130. Such an operative coupling may allow the mouse controller 142 to process sensor input from the replaceable mouse sensor assembly 130 and an optical sensor 131, and to communicate such sensor input to the information handling system 100 via the mouse wireless adapter 143 and network interface device 144.

These interchangeable modular components may also be combined in a plurality of ways to provide various power and connectivity functionalities and aesthetics. For example, a user-repairable mouse 121 in an embodiment may be assembled by operatively coupling one of a plurality of available types of user-replaceable scroll wheels 123, user-replaceable mouse top cover 124, user-replaceable mouse sensor assembly 130, and one of a plurality of different types of user-replaceable mouse bottom covers 122, each providing varying combinations of connectivity capabilities and power sources, such as a choice among wired options or wireless options including battery type (e.g., rechargeable or dry cell). A user who wishes to continue to use most of these components, such as the user-replaceable mouse sensor assembly 130, user-replaceable scroll wheel 123, user-replaceable mouse top cover 124, user-replaceable mouse battery 141, or wired or wireless user-replaceable mouse bottom cover 122, but would like to upgrade, replace, or adjust functionality of only one of these components may exchange the undesirable or broken component with a new or upgraded version of that component. The user in such a case may make such an exchange without having to replace and dispose of the remaining, currently functional components with which the user is satisfied. In such a way, assembly of the user-repairable mouse 121 may decrease waste associated with upgrading or replacing mice.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 186 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware control logic, or any combination thereof. Additional components of the information handling system 100 may include one or more storage devices 103 or 107, a wireless network interface device 160, various input and output (I/O) devices 110, a mouse 120, or any combination thereof. A power management unit 104 supplying power to the information handling system 100, via a battery 105 or an alternating current (A/C) power adapter 106 may supply power to one or more components of the information handling system 100, including the hardware processor 101, or other hardware processing resources executing code instructions, the wireless network interface device 160, a static memory 103 or drive unit 107, a video display 109, wired or wireless user-repairable mouse 121, or other components of an information handling system. Battery 105 or A/C power adapter 106 of information handling system 100 may be operatively coupled via an electrically conductive wire to the user-repairable mouse 121 that is a wired mouse. In an embodiment, where the user-repairable mouse 121 is wireless, the keyboard battery 141 that is rechargeable may be operatively coupled to the battery 105 or A/C power adapter 106 of information handling system 100 via an electrically conductive wire, such as a universal serial bus (USB) cable, to power the user-repairable mouse 121 or recharge the keyboard battery 141 that is rechargeable. Keyboard battery 141 may also be a replaceable dry cell battery in some embodiments of a wireless user-repairable mouse 121. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 may execute code instructions 187, via one or more hardware processing resources, that may operate on servers or systems, remote data centers, or on-box in individual client information handling systems 100 according to various embodiments herein. In some embodiments, it is understood any or all portions of code instructions 187 may operate on a plurality of information handling systems 100.

The information handling system 100 may include a hardware processor 101 such as a central processing unit (CPU), a graphics processing unit (GPU), a Visual Processing Unit (VPU), or a hardware accelerator, embedded controllers or hardware control logic or some combination of the same. Any of the hardware processing resources may operate to execute code that is either firmware or software code. Moreover, the information handling system 100 may include memory such as main memory 102, static memory 103, containing computer readable medium 186 storing instructions 187. In other embodiments the information handling system 100 may represent a server information handling system executing operating system (OS) software, application software, BIOS software, or other software applications or drivers detectable by hardware processor type 101. The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101.

The wireless adapter and network interface device 160 may provide connectivity of the information handling system 100 to wireless peripheral devices such as user-repairable mouse 121 or to the network 170 via a network access point (AP) in an embodiment. The network 170 in some embodiments may be a wired local area network (LAN), a wireless personal area network (WPAN) including a Bluetooth® or Bluetooth® Low Energy (BLE) WPAN, a public Wi-Fi communication network, a private Wi-Fi communication network, a public WiMAX communication network, or other non-cellular communication networks. In other embodiments, the network 170 may be a wired wide area network (WAN), a 4G LTE public network, or a 5G communication network, or other cellular communication networks. Information handling system 100 may have wireless adapter and network interface device 160 to wirelessly couple to mouse wireless adapter 143 and its radio via Bluetooth® or BLE. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, WiMAX, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6e, and the emerging Wi-Fi 7 standard. It is understood that any number of available channels may be available in WLAN under the 2.4 GHZ, 5 GHZ, or 6 GHz bands which may be shared communication frequency bands with WWAN protocols or Bluetooth® protocols in some embodiments.

In some embodiments, hardware executing software or firmware, dedicated hardware implementations such as application specific integrated circuits, programmable logic arrays and other hardware devices may be constructed to implement one or more of some systems and methods described herein. Applications that may include the hardware processing resources executing systems of various embodiments may broadly include a variety of electronic and computer systems. One or more embodiments described herein may implement functions using two or more specific interconnected hardware modules or devices with related control and data signals that may be communicated between and through the hardware modules, or as portions of an application-specific integrated circuit. Accordingly, the present embodiments encompass hardware processing resources executing software or firmware, or hardware implementations.

In accordance with various embodiments of the present disclosure, the methods described herein may be implemented by firmware or software programs executable by a hardware controller, a hardware processor system, or other hardware processing resources. Further, in an exemplary, non-limited embodiment, implementations may include distributed processing, component/object distributed processing, and parallel processing. Alternatively, virtual computer system processing may be constructed to implement one or more of the methods or functionalities as described herein. Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 may be stored in static memory 103, or the drive unit 107 on a computer-readable medium 186 such as a flash memory or magnetic disk in an example embodiment.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The hardware system, hardware device, hardware controller, or hardware module may execute software, including firmware embedded at a device, such as an Intel® brand hardware processor, ARM® brand hardware processors, Qualcomm® brand hardware processors, or other hardware processors and chipsets, or other such device, or software capable of operating a relevant environment of the information handling system. The hardware system, hardware device, hardware controller, or hardware module may also comprise a combination of the foregoing examples of hardware, or hardware processors executing firmware or software. In an embodiment an information handling system 100 may include an integrated circuit or a board-level product having portions thereof that may also be any combination of hardware and hardware executing software. Hardware devices, hardware modules, hardware resources, or hardware controllers that are in communication with one another need not be in continuous communication with each other, unless expressly specified otherwise. In addition, hardware devices, hardware modules, hardware resources, or hardware controllers that are in communication with one another may communicate directly or indirectly through one or more intermediaries.

FIG. 2A is a graphical diagram illustrating a perspective view of a user-repairable mouse with a modular and user-replaceable mouse sensor assembly according to an embodiment of the present disclosure. As described herein, the user-repairable mouse 221 in an embodiment may include a plurality of interchangeable modular-components that may be easily disassembled with minimal tools or no tools for repair. These interchangeable modular-components may also be combined in a plurality of ways to provide various power and connectivity functionalities and aesthetics. For example, a user-repairable mouse 221 in an embodiment may be assembled by operatively coupling one of a plurality of available types of scroll wheel 203*a*, user-replaceable mouse top cover 201, user-replaceable mouse sensor assembly 230 with an optical sensor lens 234, and one of a plurality of different types of user-replaceable mouse bottom covers 202, each providing varying combinations of connectivity capabilities and power sources. The user-replaceable mouse top cover 201 may include one or more mouse selection buttons and one or more other buttons, such as side buttons shown, that may trigger one or more button switches within the user-repairable mouse 221 when actuated.

A user who wishes to continue to use most of these components, such as the user-replaceable mouse sensor assembly 230 with an optical sensor lens 234, user-replaceable scroll wheel 203a, user-replaceable mouse top cover 201, or wired or wireless user-replaceable mouse bottom cover 202, but would like to upgrade, replace, or adjust functionality of only one of these components may exchange the undesirable or broken component with a new or upgraded version of that component. The user in such a case may make such an exchange without having to replace and dispose of the remaining, currently functional components with which the user is satisfied. In such a way, assembly of the user-repairable mouse 221 may decrease waste associated with upgrading or replacing mice.

FIG. 2B is a graphical diagram illustrating an exploded perspective view of a user-repairable mouse with a releasable fastener for ease of disassembly according to an embodiment of the present disclosure. A wired or wireless user-replaceable mouse bottom cover 202 including an optical sensor lens 234 in another embodiment may be formed with a releasable fastener 204 for easy disassembly and separation of the user-replaceable mouse bottom cover 202 and the user-replaceable mouse top cover 201. Upon such a disassembly in an embodiment, a user may access, remove, and replace various components mounted to the user-replaceable wired or wireless mouse bottom cover 202, as described in greater detail herein.

FIG. 2C is a graphical diagram illustrating an exploded perspective view of a user-repairable mouse with a wireless user-repairable mouse bottom cover and a user-replaceable wireless mouse top cover according to an embodiment of the present disclosure. A user-replaceable wireless mouse bottom cover 202 in an embodiment may be formed to include a scroll wheel assembly for mounting a user-replaceable scroll wheel 203a. The user-replaceable wireless mouse bottom cover 202 in an embodiment may be easily detachable from the user-replaceable wireless mouse top cover 201 in order to access, remove, and replace various internal components mounted to the user-replaceable wireless mouse bottom cover 202. As described in greater detail above with respect to FIG. 1, the user replaceable wireless mouse bottom cover 202 in an embodiment may incorporate a user-replaceable mouse battery, a mouse controller, and a mouse wireless adapter for establishing a wireless link with an information handling system.

A user-replaceable mouse top cover 201 may be formed with a magnetic top cover gasket 207 for operative coupling with the user-replaceable mouse bottom cover 202. A user-replaceable wired or wireless mouse bottom cover 202 in an embodiment may be operatively coupled to the user-replaceable mouse top cover 201 to form a user repairable and user-replaceable mouse 221. Such an operative coupling in an embodiment may involve contact being made between a user-replaceable mouse bottom cover 202 magnetic bottom cover gasket (as shown below with respect to FIG. 2E) and the magnetic top cover gasket 207 within the user-replaceable mouse top cover 201. Magnetic top cover gasket 207 may be a permanent magnet with opposite polarity of a mouse bottom cover gasket (not shown) or may be a ferromagnetic material that magnetically attracts to magnetic mouse bottom cover gasket.

FIG. 2D is a graphical diagram illustrating an exploded perspective view of a user-repairable mouse with a wired user-repairable mouse bottom cover according to an embodiment of the present disclosure. A user-replaceable wired mouse bottom cover 202 in an embodiment may be formed to include a scroll wheel assembly cradle 203b for mounting a user-replaceable scroll wheel 203a. Scroll wheel assembly cradle 203b may include an angular rotational motion sensor encoder to detect scrolling with scroll wheel rotation and provide such detected scrolling input data to a mouse controller in embodiments herein. The user-replaceable wired mouse bottom cover 202 in an embodiment may be easily detachable from the user-replaceable wired mouse top cover 201 in order to access, remove, and replace various internal components mounted to the user-replaceable wireless mouse bottom cover 202. As described in greater detail above with respect to FIG. 1, the user replaceable wired mouse bottom cover 202 in an embodiment may operatively couple with an information handling system via a wired connection such as a USB wired connection for the transfer of power and data.

A user-replaceable mouse top cover 201 may be formed with a magnetic top cover gasket 207 for operative coupling with the user-replaceable mouse bottom cover 202. A user-replaceable wired or wireless mouse bottom cover 202 in an embodiment may be operatively coupled to the user-replaceable mouse top cover 201 to form a user repairable and user-replaceable mouse 221. Such an operative coupling in an embodiment may involve contact being made between a user-replaceable mouse bottom cover 202 magnetic bottom cover gasket (as shown below with respect to FIG. 2E) and the magnetic top cover gasket 207 with opposite polarization or where one side is ferromagnetic within the user-replaceable mouse top cover 201.

Figure 2E:
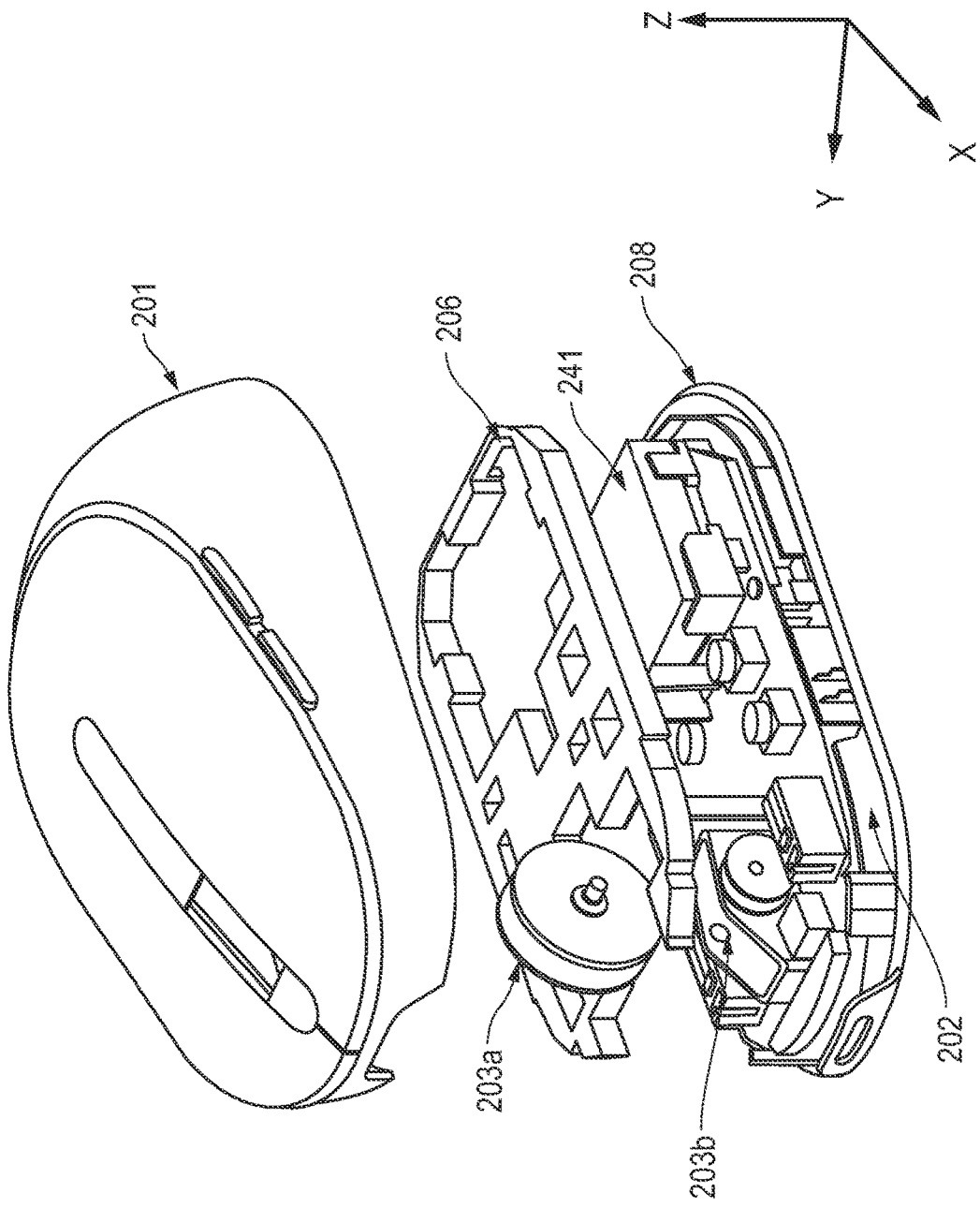
FIG. 2E is a graphical diagram illustrating an exploded perspective view a plurality of user-replaceable internal components for a user-repairable mouse according to an embodiment of the present disclosure.

FIG. 2E is a graphical diagram illustrating an exploded perspective view of a user-repairable mouse with a plurality of user-replaceable internal components according to an embodiment of the present disclosure. A user-replaceable wired or wireless mouse bottom cover 202 in an embodiment may be formed to include a magnetic bottom cover gasket 208 and a scroll wheel assembly cradle 203b and may also house a mouse main printed circuit board assembly (PCB) 240 that is operatively coupled to a user-replaceable mouse battery 241. The magnetic bottom cover gasket 208 may be a permanent magnet of opposite polarity to the magnetic top cover gasket 207 or may be a ferromagnetic material magnetically couplable to the magnetic top cover gasket 207. Either or both of the magnetic top cover gasket 207 and magnetic bottom cover gasket 208 may be magnetic material (of opposite polarity) or either one of magnetic top cover gasket 207 and magnetic bottom cover gasket 208 may be ferromagnetic for magnetic attraction to the other. A cover 206 may be disposed between the various components mounted to the user-replaceable wired or wireless mouse bottom cover 202 and the user-replaceable mouse top cover 201.

A user-replaceable mouse scroll wheel 203a may be formed in an embodiment for mounting within and operative coupling to the scroll wheel assembly cradle 203b within the user-replaceable wired or wireless mouse bottom cover 202. In an embodiment employing a user-replaceable wireless mouse bottom cover 202, the user-replaceable wireless mouse bottom cover 202 may be operatively coupled to the user-replaceable mouse battery 241 as well as a mouse main PCB 240 with a wireless adapter and mouse controller. For example, the user-replaceable mouse battery 241 may include one or more conductive traces that come into contact with one or more conductive traces of the mouse main PCB 240 upon fastening of the user-replaceable mouse battery 241 to the mouse main PCB 240. Such mounting may include snapping the user-replaceable mouse battery 241 into place within a plurality of releasable plastic tabs which the user may also bend outward in order to remove and replace the user-replaceable mouse battery 241. A user-replaceable wired or wireless mouse bottom cover 202 in an embodiment may be operatively coupled to the user-replaceable mouse top cover 201 to form a user repairable and user-replaceable mouse 221. Such an operative coupling in an embodiment may involve contact being made between a user-replaceable mouse bottom cover 202 magnetic bottom cover gasket 208 and the magnetic top cover gasket (207 of FIG. 2D) of opposite polarity or either side being ferromagnetic within the user-replaceable mouse top cover 201.

FIG. 3A is a graphical diagram illustrating a perspective view of a user-repairable mouse bottom cover with a plurality of user-replaceable internal components according to an embodiment of the present disclosure. These components may include, for example, a board-to-board connector 380 that operatively connects a mouse main PCB 340 mounted to the user-replaceable wired or wireless mouse bottom cover 302 and a sensor PCB 332 of a user-replaceable mouse sensor assembly to which a mouse optical sensor 331 may be operatively coupled. In an embodiment, board-to-board connector 380 is a floating connector with main board side connector contacts on the mouse main PCB 340 and sensor board side connector contacts on mouse sensor PCB 332 providing for ease of power and data connection and disconnection for removal and replacement of a user replaceable mouse sensor assembly according to the disclosure herein. The user-replaceable wired or wireless mouse bottom cover 302 in an embodiment may include a scroll wheel assembly cradle 303b, a user-replaceable scroll wheel 303a, the user-replaceable mouse battery 341, and also includes a mouse main PCB 340 that is operatively coupled to the board-to-board connector 380. The user-replaceable mouse scroll wheel 303a may be disposed within the scroll wheel assembly cradle 303b of the user-replaceable wired or wireless mouse bottom cover 302.

Figure 3B:
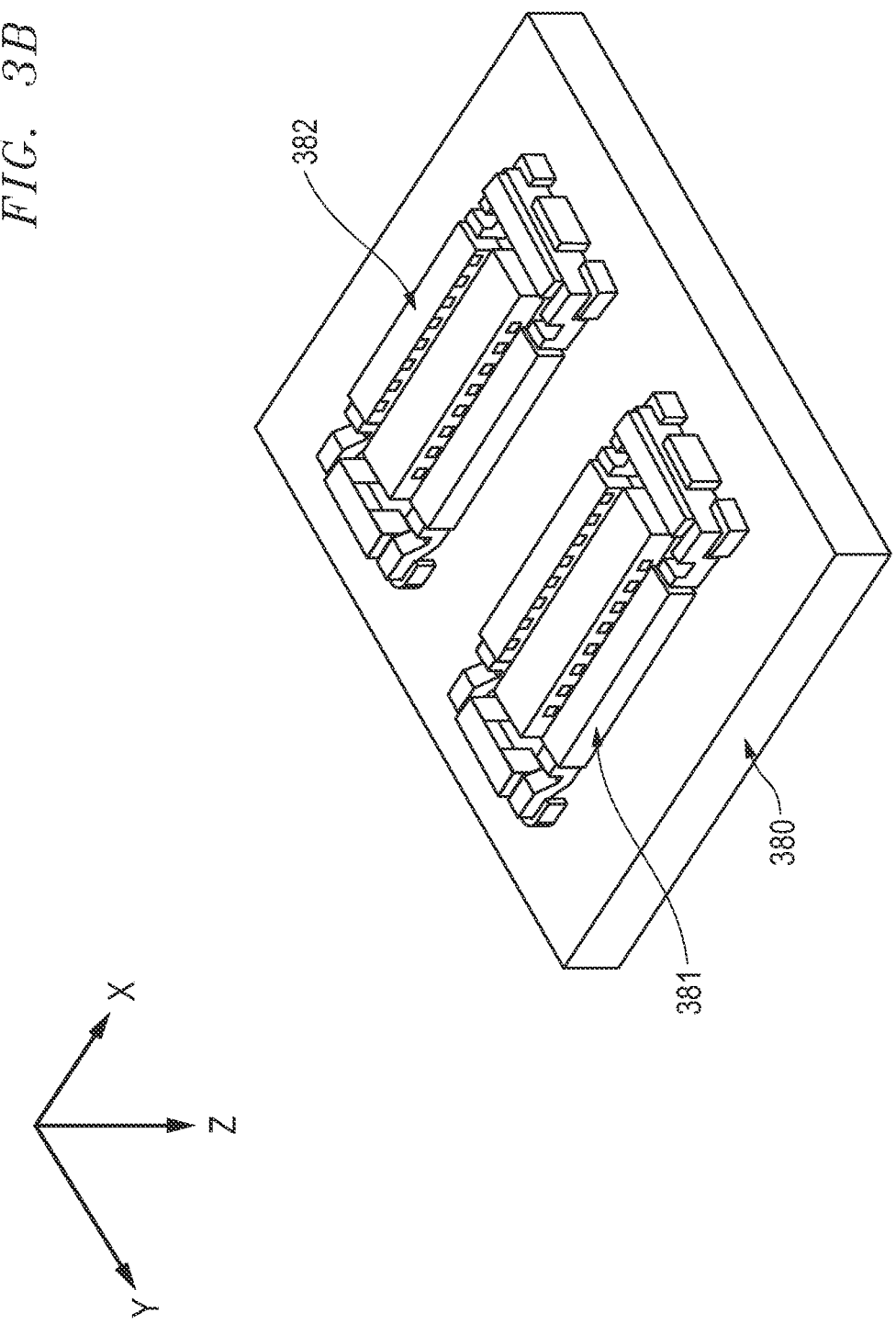
FIG. 3B is a graphical diagram illustrating a perspective view of the bottom of a board-to-board connector according to an embodiment of the present disclosure.

FIG. 3B is a graphical diagram illustrating a bottom perspective view of a board-to-board connector for operative coupling of a sensor printed circuit board (PCB) and a mouse main printed circuit board assembly (PCB) according to an embodiment of the present disclosure. A board-to-board connector 380 in an embodiment may be formed to comprise a first side 381 of a sensor PCB connector for bridging data and power to a second side 382 of a main PCB connector within the user-replaceable mouse sensor assembly, as described in greater detail below with respect to FIGS. 3C, 3D, and 3E. The board-to-board connector 380 has floating connector sides for the first side 381 and second side 382 that may move or adjust when operatively coupled in a main PCB connector and sensor PCB connector respectively so that the mouse main PCB and mouse sensor PCB may shift or move relative to one another in an embodiment. The mouse sensor PCB may include sensor board side contacts of the sensor PCB connector for mating with the first side of the sensor PCB connector 381 on the board-to-board connector 380 upon insertion of the user-replaceable mouse sensor assembly within an aperture of the user-replaceable wireless or wired mouse bottom cover, as also described in greater detail below with respect to FIGS. 3C, 3D, and 3E. The board-to-board connector 380 in an embodiment may further include a second side 382 of a mouse main PCB connector for operative coupling with the mouse main PCB (340 of FIG. 3A) having main board side connector contacts. In one embodiment, the first side 381 of a sensor PCB connector on the board-to-board connector 380 may include a magnetic casing and a plurality of electrical contacts where the magnetic casing may assist in alignment and operative coupling to the sensor board side contacts of the mouse sensor board 332 which may have reciprocal magnetic alignment structure. In another embodiment, the second side 382 of a mouse main PCB connector on the board-to-board connector 380 may include a magnetic casing and a plurality of electrical contacts where the magnetic casing may assist in alignment and operative coupling to the main board side contacts of the mouse main board 340 which may have reciprocal magnetic alignment structure. The sensor PCB 332, mouse main PCB 340, and board-to-board connector 380 may be disposed within the user-replaceable wired or wireless mouse bottom cover (302 of FIG. 3A) of embodiments herein.

FIG. 3C is a graphical diagram illustrating an exploded perspective view of a user-replaceable mouse bottom cover with a removeable and user-replaceable mouse sensor assembly according to an embodiment of the present disclosure. A user-replaceable wired or wireless mouse bottom cover 302 in an embodiment may be formed to have a replaceable mouse sensor aperture 397, for insertion of a user-replaceable mouse sensor assembly 330 having an optical sensor lens 334 and a sliding foot 337. The user-replaceable mouse sensor assembly 330 in an embodiment may be operatively coupled to the user-replaceable wired or wireless mouse bottom cover 302 via a mouse sensor assembly fastener 309, which may comprise a screw in an example embodiment. In other embodiments, it is contemplated that other various types of fasteners may also be used, including releasable magnets, sliding latches, or snaps as the mouse sensor assembly fastener 309. Such a mouse sensor assembly fastener 309 in an embodiment may be easily removeable for the user with limited or no use of tools. Following removal of or actuation to release a mouse sensor assembly fastener 309 in an embodiment, the user-replaceable mouse sensor assembly 330 may be disconnected from the board-to-board connector first side 381 and removed, repaired, or replaced by a new, repaired, or upgraded user-replaceable mouse sensor assembly to repair or upgrade sensor functionality without disposal or replacement of the entire user-repairable mouse.

Such a new, upgraded, or repaired user-replaceable mouse sensor assembly 330 in an embodiment may be disposed through the replaceable mouse sensor aperture 397 in the user-replaceable wired or wireless mouse bottom cover 302. In another aspect of an embodiment, a currently used user-replaceable mouse sensor assembly 330 may be inserted through the replaceable mouse sensor aperture 397 of a new, upgraded, or repaired user-replaceable wired or wireless mouse bottom cover 302. In such a way, the user may continue to use the user-replaceable mouse sensor assembly 330 while changing from a wired to a wireless user-replaceable mouse bottom cover 302 for example, or upgrading a previously used user-replaceable wired or wireless mouse bottom cover 302. The mouse sensor PCB of the user-replaceable mouse sensor assembly 330 may have a sensor board side of a sensor PCB connector for mating with the first side 381 to form the sensor PCB connector to operatively couple to the board-to-board connector 380 upon insertion of the new, upgraded, or repaired user-replaceable mouse sensor assembly 330 within the aperture 397 of the user-replaceable wireless or wired mouse bottom cover 302 according to embodiments herein.

FIG. 3D is a graphical diagram illustrating a perspective view of a user-replaceable mouse sensor assembly for operative coupling with a user-replaceable mouse bottom cover according to an embodiment of the present disclosure. As described herein, the user-replaceable mouse sensor assembly 330 in an embodiment may be modular and easily removable from and insertable within a replaceable mouse sensor aperture (397 of FIG. 3C) of a user-replaceable wired or wireless mouse bottom cover (302 of FIG. 3C). As such, the user-replaceable mouse sensor assembly 330 may comprise various components for sensing movement with an optical sensor 331 of the user-repairable mouse incorporating the user-replaceable mouse sensor assembly 330 and the user-replaceable wired or wireless mouse bottom cover (302 of FIG. 3C), and for communicating such optical sensor input to a mouse main printed circuit board assembly (PCB) (340 of FIG. 3A) operatively coupled to the user-replaceable wired or wireless mouse bottom cover (302 of FIG. 3C).

A user-replaceable mouse sensor assembly 330 in an embodiment may be formed to include a sensor printed circuit board (PCB) holder 335 to which a mouse sensor PCB 332 may be mounted. A optical sensor 331 may be mounted to and operatively coupled to the mouse sensor PCB 332 in an embodiment. The optical sensor 331 may comprise a light emitting diode (LED) and light diode sensor and, in an embodiment, may operate to register optical sensor input from the optical sensor 331 via optical sensor lens (not shown) disposed within the sensor PCB holder 335 and below the sensor PCB 332. The sensor PCB holder 335 may be formed with a surface-leveling spring 336 to compress against the mouse bottom cover upon a user tilting the mouse bottom cover at an angle with respect to a track surface during use, as described in greater detail below with respect to FIGS. 4A and 4B, such that the sensor PCB holder 335 remains level with the track surface.

The user-replaceable mouse sensor assembly 330 in an embodiment may further include a sensor board side portion of contacts 333 of a sensor PCB connector on the sensor PCB 332 for operative coupling of the user-replaceable mouse sensor assembly 330 and sensor PCB 332 to the mouse main PCB (340 of FIG. 3A) within the user-upgradeable wired or wireless mouse bottom cover (302 of FIG. 3C). This operative coupling occurs upon insertion of the user-replaceable mouse sensor assembly 330 within the replaceable mouse sensor aperture (397 of FIG. 3C). The replaceable mouse sensor PCB 332 in an embodiment may be formed with a sensor board side portion of contacts 333 of the sensor PCB connector for mating with the first side (381 of FIG. 3B) of the sensor PCB connector on the board-to-board connector (380 of FIG. 3B) to form a mated sensor PCB connector. Because the board-to-board connector (380 of FIG. 3A) is also operatively coupled to the mouse main PCB (340 of FIG. 3A), operatively coupling the sensor board side portion of contacts 333 of a sensor PCB connector to the first side (381 of FIG. 3C) upon insertion of the user-replaceable mouse sensor assembly 330 within the replaceable mouse sensor aperture (397 of FIG. 3C) may operatively couple the optical sensor 331 and the mouse sensor PCB 332 to the mouse main PCB (340 of FIG. 3A) within the user-replaceable wired or wireless mouse bottom cover (302 of FIG. 3A). In some embodiments, such operative coupling may be assisted with magnetic alignment of the sensor board side portion of contacts 333 of the sensor PCB connector with the first side 381 on the board-to-board connector (380 of FIG. 3B).

FIG. 3E is a graphical diagram illustrating an exploded perspective view of a user-replaceable mouse sensor assembly with a surface leveling spring according to an embodiment of the present disclosure. A replaceable mouse sensor PCB 332 may be formed in an embodiment with a sensor board side 333 of the sensor PCB connector for mating with the first side of the sensor PCB connector on the board-to-board connector. A sensor PCB holder 335 may be formed with a surface-leveling spring 336 to compress against the mouse bottom cover upon a user tilting the mouse bottom cover at an angle with respect to a track surface during use, as described in greater detail below with respect to FIGS. 4A and 4B, such that the sensor PCB holder 335 remains level with the track surface. The user-replaceable mouse sensor assembly 330 may be formed for disposition within the replaceable mouse sensor aperture (397 of FIG. 3C) of the user-replaceable wired or wireless mouse bottom cover (302 of FIG. 3C). The user-replaceable mouse sensor assembly 330 in an embodiment may include the optical sensor lens 334 disposed within a sensor PCB holder 335 and under an optical sensor 331 on a sensor PCB 332. The user-replaceable mouse sensor assembly 330 in an embodiment may include a gliding foot 337 mounted beneath the sensor PCB holder 335 for contacting a tracking surface. Optical sensor 331 includes a light source such as an LED and a light sensor, such as a sensing diode as understood in the art. The sensing diode or LED used as a sensor portion may detect movement of the user-repairable mouse from light transmitted and reflected through the optical sensor lens 334 from the track surface upon which the user-repairable mouse is moved.

FIG. 4A is a graphical diagram illustrating a cut-away view of a user-replaceable mouse sensor assembly with a surface leveling spring operatively coupled with a user-replaceable mouse bottom cover according to an embodiment of the present disclosure. As described herein, a user-replaceable mouse sensor assembly may include a surface-leveling spring 436 for keeping the bottom surface, such as gliding foot 437 of the user-replaceable mouse sensor assembly level with a track surface when the user rapidly swipes in one direction, which may cause the body of the user-repairable mouse to tilt. For example, a sensor PCB holder 435 in an embodiment may be formed with a surface-leveling spring 436 to compress against the user-replaceable wired or wireless mouse bottom cover 406 upon a user tilting the mouse bottom cover 406 at an angle with respect to a track surface during use, such that the sensor PCB holder 435 and the gliding foot 437 remain level with the track surface. Such automatic leveling in an embodiment may decrease erroneous sensor readings resulting from the mouse sensor tilting with the body of the mouse, as occurs in existing systems.

FIG. 4B is a graphical diagram illustrating rear view of a user-repairable mouse including a surface leveling spring to bring a mouse sensor level with a track surface during tilting by the user of the user-repairable and user-upgradable mouse according to an embodiment of the present disclosure. As described herein, a user-replaceable mouse sensor assembly may include a surface-leveling spring for keeping the bottom surface such as gliding foot 437 of the user-replaceable mouse sensor assembly level with a track surface 499 when the user rapidly swipes in one direction (e.g., to the right), which may cause the body 402 of the user-repairable mouse to tilt at an angle 498 with respect to the track surface 499. The surface-leveling spring described in embodiments herein may then compress to keep the gliding foot 437 level with the track surface 499. Such automatic leveling in an embodiment may decrease erroneous sensor readings resulting from the mouse sensor tilting with the body of the mouse, as occurs in existing systems.

Figure 5:
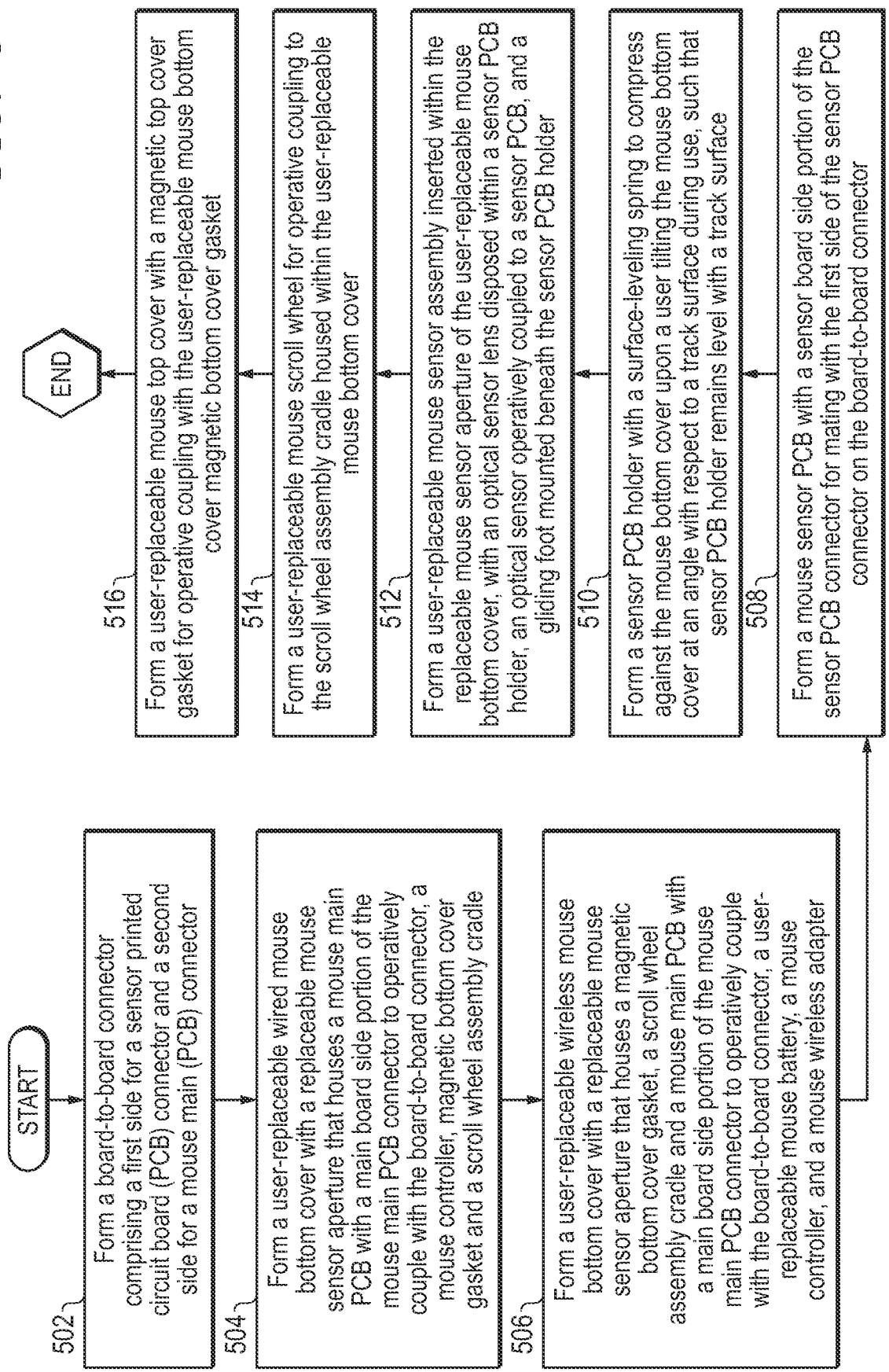
FIG. 5 is a flow diagram illustrating a method of forming a plurality of user-replaceable, modular components for a user-repairable mouse according to an embodiment of the present disclosure.

FIG. 5 is a flow diagram illustrating a method of forming a plurality of user-replaceable, modular components for a user-repairable mouse that allows a user to repair or upgrade any individual component without disposing of the entire mouse according to an embodiment of the present disclosure. As described herein, the user-repairable mouse in an embodiment may comprise a plurality of modular-components that may be easily disassembled with minimal tools or no tools for repair. These interchangeable modular-components may also be combined in a plurality of ways to provide various power and connectivity functionalities and aesthetics. For example, a user-repairable mouse in an embodiment may comprise one of a plurality of available types of scroll wheel, user-replaceable mouse top cover, user-replaceable mouse sensor assembly, and one of a plurality of different types of user-replaceable mouse bottom covers, each providing varying combinations of connectivity capabilities and power sources. In addition, a user-replaceable mouse sensor assembly may further include a surface-leveling spring for keeping the bottom surface of the user-replaceable mouse sensor assembly level with a track surface when the user rapidly swipes in one direction, which may cause the body of the user-repairable mouse to tilt. Such automatic leveling in embodiments herein may decrease erroneous sensor readings resulting from the mouse sensor tilting with the body of the mouse, as occurs in existing systems.

At block 502, a board-to-board connector may be formed to comprise a first side of a sensor printed circuit board (PCB) connector in an embodiment. For example, in an embodiment described with reference to FIG. 1, in both the wired and wireless versions for the user-repairable mouse 121, the mouse main PCB 140 may be operatively coupled to a mouse sensor PCB 132 of a replaceable mouse sensor assembly 130 via a mouse board-to-board connector 150. Such an operative coupling may allow the mouse controller 142 to process optical sensor input from the replaceable mouse sensor assembly 130 and optical sensor 131, and to communicate such optical sensor input to the information handling system 100 via the mouse wireless adapter 143 or network interface device 144.

In other example embodiments described with reference to FIGS. 3A, 3B, 3C, and 3D, a board-to-board connector 380 may operatively couple a mouse main PCB 340 mounted to the user-replaceable wired or wireless mouse bottom cover 302 and a sensor PCB 332 of a user-replaceable mouse sensor assembly 330. The board-to-board connector 380 may be formed to comprise a first side 381 of a sensor PCB connector for operative coupling with a sensor board side 333 of the sensor PCB connector on the sensor board PCB within the user-replaceable mouse sensor assembly 330. The board-to-board connector 380 in an embodiment may further include a second side 382 of a mouse main PCB connector for operative coupling with a main board side of the mouse main PCB connector on the mouse main PCB 340 that is mounted to the user-replaceable wired or wireless mouse bottom cover 302. The mouse sensor PCB 332 of the user-replaceable mouse sensor assembly 330 may include the sensor board side 333 of a sensor PCB connector for mating with the first side of the sensor PCB connector 381 on the board-to-board connector 380 upon insertion of the user-replaceable mouse sensor assembly 330 within the aperture 397 of the user-replaceable wireless or wired mouse bottom cover 302.

A wired mouse bottom cover in an embodiment may be formed at block 504, with a releasable fastener and a replaceable mouse sensor aperture. The wired mouse bottom cover in an embodiment may include a magnetic bottom cover gasket and a scroll wheel assembly and may also house a mouse main printed circuit board assembly (PCB) that is operatively coupled to a mouse controller and other components. Mouse main PCB may also include a mouse main board side set of contacts for operative coupling to a second side (e.g., 382) of the board-to-board connector according to embodiments herein. For example, in an embodiment described with reference to FIG. 1, a wired power source and a data and power cable or connector in an embodiment may be operatively coupled to a mouse main PCB within the wired user-repairable mouse bottom cover 122, to which a mouse controller 142 may also be operatively coupled. The mouse main PCB 140 of the wired user-repairable mouse 121 may be operatively coupled to a mouse sensor PCB 132 of a replaceable mouse sensor assembly 130 via a mouse board-to-board connector 150 according to embodiments herein. Such an operative coupling may allow the mouse controller 142 to process optical sensor input from an optical sensor 131 of the replaceable mouse sensor assembly 130 and to communicate such optical sensor input to the information handling system 100 via the mouse wireless adapter 143 or network interface device 144.

In other example embodiments described with respect to FIGS. 2B, 2D, and 2E, a wired mouse bottom cover 202 may be formed with a releasable fastener 204 for easy disassembly and separation of the user-replaceable mouse bottom cover 202 and the user-replaceable mouse top cover 201. The user-replaceable wired mouse bottom cover 202 in an embodiment may be easily detachable from the user-replaceable wireless mouse top cover 201 in order to access, remove, and replace various internal components mounted to the user-replaceable wireless mouse bottom cover 202. The user replaceable wired mouse bottom cover 202 in an embodiment may operatively couple with an information handling system via a wired connection for the transfer of power and data.

A user-replaceable mouse top cover 201 may be formed with a magnetic top cover gasket 207 for operative coupling with the user-replaceable mouse bottom cover 202. A user-replaceable wired mouse bottom cover 202 in an embodiment may be operatively coupled to the user-replaceable mouse top cover 201 to form a user repairable and user-replaceable mouse 221. Such an operative coupling in an embodiment may involve contact being made between a user-replaceable mouse bottom cover 202 magnetic bottom cover gasket and the magnetic top cover gasket 207 within the user-replaceable mouse top cover 201. A user-replaceable wired mouse bottom cover 202 in an embodiment may be formed to include a magnetic bottom cover gasket 208 and a scroll wheel assembly cradle 203b and may also house a mouse main printed circuit board assembly (PCB) 240 that is operatively coupled to a power and data port connector or power and data cable operatively coupled to an information handling system and power source.

In other example embodiments described with reference to FIGS. 3A and 3C, the user-replaceable wired mouse bottom cover 302 in an embodiment may include a scroll wheel assembly 303b, mounting a user-replaceable scroll wheel 303a, and may also include a mouse main PCB 340 that is operatively coupled to the board-to-board connector 380. A user-replaceable wired mouse bottom cover 302 may be formed to have a replaceable mouse sensor aperture 397, for insertion of a user-replaceable mouse sensor assembly 330.

At block 506, a wireless mouse bottom cover in an embodiment may be formed, with a releasable fastener and a replaceable mouse sensor aperture. The wireless mouse bottom cover in an embodiment may include a magnetic bottom cover gasket and a scroll wheel assembly and may also house a mouse main PCB that is operatively coupled to a mouse controller, a user-replaceable mouse battery, a mouse wireless adapter, and the mouse main board side connector contacts for operative coupling to the board-to-board connector. For example, in an embodiment described with reference to FIG. 1, the user-replaceable mouse battery 141 may be operatively coupled to a mouse main PCB within the wireless user-repairable mouse bottom cover 122, to which a mouse controller 142 and a mouse wireless adapter 143 may also be operatively coupled. The mouse main PCB 140 may be operatively coupled to a mouse sensor PCB 132 of a replaceable mouse sensor assembly 130 via a mouse board-to-board connector 150. Such an operative coupling may allow the mouse controller 142 to process optical sensor input from an optical sensor 131 of the replaceable mouse sensor assembly 130 and to communicate such optical sensor input to the information handling system 100 via the mouse wireless adapter 143.

As also described in example embodiments with respect to FIGS. 2B, 2C, 2D, and 2E, a wireless mouse bottom cover 202 may be formed with a releasable fastener 204 for easy disassembly and separation of the user-replaceable mouse bottom cover 202 and the user-replaceable mouse top cover 201. A user-replaceable wireless mouse bottom cover 202 in an embodiment may be formed to include a scroll wheel assembly for mounting a user-replaceable scroll wheel 203a. The user replaceable wireless mouse bottom cover 202 in an embodiment may incorporate a user-replaceable mouse battery 241 and a network interface device for establishing a wireless link with an information handling system.

A user-replaceable mouse top cover 201 may be formed with a magnetic top cover gasket 207 for operative coupling with the user-replaceable mouse bottom cover 202. A user-replaceable wireless mouse bottom cover 202 in an embodiment may be operatively coupled to the user-replaceable mouse top cover 201 to form a user repairable and user-replaceable mouse 221. Such an operative coupling in an embodiment may involve contact being made between a user-replaceable mouse bottom cover 202 magnetic bottom cover gasket and the magnetic top cover gasket 207 within the user-replaceable mouse top cover 201. A user-replaceable wireless mouse bottom cover 202 in an embodiment may be formed to include a magnetic bottom cover gasket 208 and a scroll wheel assembly cradle 203b and may also house a mouse main PCB 240 that is operatively coupled to a user-replaceable mouse battery 241.

In other example embodiments described with reference to FIGS. 3A and 3C, the user-replaceable wireless mouse bottom cover 302 may include a scroll wheel assembly cradle 303b, mounting a user-replaceable scroll wheel 303a, and may also include a mouse main PCB 340 that is operatively coupled to the board-to-board connector 380, and the user-replaceable mouse battery 341. A user-replaceable wireless mouse bottom cover 302 in an embodiment may be formed to have a replaceable mouse sensor aperture 397, for insertion of a user-replaceable mouse sensor assembly 330.

A replaceable mouse sensor PCB may be formed in an embodiment at block 508 with sensor board side connector contacts of the sensor PCB connector for mating with the first side of the sensor PCB connector on the board-to-board connector. For example, in embodiments described with reference to FIGS. 3B, 3C, 3D, and 3E, the replaceable mouse sensor PCB may include sensor board side connector contacts 333 of the sensor PCB connector for mating with the first side of the sensor PCB connector 381 on the board-to-board connector 380 upon insertion of the user-replaceable mouse sensor assembly 330 within an aperture 397 of the user-replaceable wireless or wired mouse bottom cover 302. Because the board-to-board connector 380 is also operatively coupled to the mouse main PCB 340, operatively coupling the sensor board side connector contacts 333 of the sensor PCB connector to the first side 381 of the board-to-board connector, the insertion of the user-replaceable mouse sensor assembly 330 within the replaceable mouse sensor aperture 397 operatively couples the optical sensor 331 on the mouse sensor PCB 332 to the mouse main PCB 340 within the user-replaceable wired or wireless mouse bottom cover 302.

At block 510, a sensor PCB holder may be formed with a surface-leveling spring to compress against the mouse bottom cover upon a user tilting the mouse bottom cover at an angle with respect to a track surface during use, such that the sensor PCB holder remains level with the track surface. For example, in an embodiment described with reference to FIG. 3D, a sensor PCB holder 335 may be formed with a surface-leveling spring 336 to compress against the mouse bottom cover upon a user tilting the mouse bottom cover at an angle with respect to a track surface during use, such that the sensor PCB holder 335 remains level with the track surface.

In other example embodiments described with reference to FIGS. 4A and 4B, a user-replaceable mouse sensor assembly may include a surface-leveling spring 436 for keeping the bottom surface, such as gliding foot 437, of the user-replaceable mouse sensor assembly level with a track surface when the user rapidly swipes in one direction, which may cause the body of the user-repairable mouse to tilt. More specifically, a sensor PCB holder 435 in an embodiment may be formed with a surface-leveling spring 436 to compress against the user-replaceable wired or wireless mouse bottom cover 406 upon a user tilting the mouse bottom cover 406 at an angle with respect to a track surface during use, such that the sensor PCB holder 435 and the gliding foot 437 remain level with the track surface. Such automatic leveling in an embodiment may decrease erroneous sensor readings resulting from the mouse sensor tilting with the body of the mouse, as occurs in existing systems.

In an embodiment at block 512, a user-replaceable mouse sensor assembly may be formed for disposition within the replaceable mouse sensor aperture of the mouse bottom cover. The user-replaceable mouse sensor assembly in an embodiment may include a sensor lens disposed within a sensor PCB holder and under an optical sensor on a sensor PCB, and a gliding foot mounted beneath the sensor PCB holder. For example, in embodiments described with reference to FIGS. 3C, 3D, and 3E, a user-replaceable wired or wireless mouse bottom cover 302 in an embodiment may be formed to have a replaceable mouse sensor aperture 397, for insertion of a user-replaceable mouse sensor assembly 330. The user-replaceable mouse sensor assembly 330 in an embodiment may be formed to include a sensor printed circuit board (PCB) holder 335 to which a sensor PCB 332 may be mounted. A optical sensor 331 may be operatively coupled to the sensor PCB 332 in an embodiment. The optical sensor 331 in an embodiment may operate to register optical sensor input from a sensor lens 334 disposed within the sensor PCB holder 335 and under the optical sensor 331 on the sensor PCB 332. The user-replaceable mouse sensor assembly 330 may be formed for insertion within the replaceable mouse sensor aperture 397 of the user-replaceable wired or wireless mouse bottom cover 302. The user-replaceable mouse sensor assembly 330 in an embodiment may include a sensor lens 334 disposed within the sensor PCB holder 335 and under the optical sensor 331 mounted to the sensor PCB 332, and gliding foot 337 mounted beneath the sensor PCB holder 335 for contacting a tracking surface.

At block 514, a user-replaceable mouse scroll wheel may be formed in an embodiment for mounting within and operative coupling to the scroll wheel assembly cradle housed within the mouse bottom cover. For example, in an embodiment described with reference to FIG. 2E, a user-replaceable mouse scroll wheel 203a may be formed for mounting within and operative coupling to the scroll wheel assembly cradle 203b within the user-replaceable wired or wireless mouse bottom cover 202.

A user-replaceable mouse top cover may be formed in an embodiment at block 516 with a magnetic top cover gasket for operative coupling with the mouse bottom cover magnetic bottom cover gasket. For example, in an embodiment described with reference to FIGS. 2C and 2D, a user-replaceable mouse top cover 201 may be formed with a magnetic top cover gasket 207 for operative coupling with the user-replaceable mouse bottom cover 202. In such a way, the user-repairable mouse in an embodiment may comprise a plurality of modular-components that may be easily disassembled with minimal tools or no tools for repair and combined in a plurality of ways to provide various power and connectivity functionalities and aesthetics. The method for forming a plurality of user-replaceable, modular components for a user-repairable mouse according to an embodiment of the present disclosure may then end.

FIG. 6 is a flow diagram illustrating a method of assembling a plurality of user-replaceable, modular components together to form a user-repairable mouse that allows a user to repair or upgrade any individual component without disposing of the entire mouse according to an embodiment of the present disclosure. As described herein, a user-repairable mouse in an embodiment may be assembled by operatively coupling one of a plurality of available types of scroll wheel, user-replaceable mouse top cover, user-replaceable mouse sensor assembly, and one of a plurality of different types of user-replaceable mouse bottom covers, each providing varying combinations of connectivity capabilities and power sources. A user who wishes to continue to use most of these components, such as the user-replaceable mouse sensor assembly, scroll wheel, user-replaceable mouse top cover, user-replaceable mouse battery, or wired or wireless user-replaceable mouse bottom cover, but would like to upgrade, replace, or adjust functionality of only one of these components may exchange the undesirable or broken component with a new or upgraded version of that component. The user in such a case may make such an exchange without having to replace and dispose of the remaining, currently functional components with which the user is satisfied. In such a way, assembly of the user-repairable mouse may decrease waste associated with upgrading or replacing mice.

At block 602, a user-replaceable mouse sensor assembly in an embodiment may be disposed through a replaceable mouse sensor aperture in the wired or wireless mouse bottom cover. For example, in embodiments described with respect to FIGS. 3A, 3B, 3C and 3D, the user-replaceable mouse sensor assembly 330 may be disposed through the replaceable mouse sensor aperture 397 in the user-replaceable wired or wireless mouse bottom cover 302. The replaceable mouse sensor PCB 332 in an embodiment may be formed with a sensor board side 333 of the sensor PCB connector for mating with the first side 381 of the sensor PCB connector on the board-to-board connector 380. Because the board-to-board connector 380 in an embodiment is also operatively coupled to the mouse main PCB 340, operatively coupling the sensor board side 333 of the sensor PCB connector to the first side 381 upon insertion of the user-replaceable mouse sensor assembly 330 within the replaceable mouse sensor aperture 397. This may operatively couple the optical sensor 331 and the mouse sensor PCB 332 to the mouse main PCB 340 within the user-replaceable wired or wireless mouse bottom cover 302.

The user-replaceable mouse sensor assembly in an embodiment at block 604 may be operatively coupled to the wired or wireless mouse bottom cover via a mouse sensor assembly fastener. For example, in an embodiment described with reference to FIG. 3C, the user-replaceable mouse sensor assembly 330 may be operatively coupled to the user-replaceable wired or wireless mouse bottom cover 302 via a mouse sensor assembly fastener 309, which may comprise a screw, a sliding latch, a releasable clip, or other fasteners as example embodiments. Such a mouse sensor assembly fastener 309 in an embodiment may be easily removeable for the user with limited or no use of tools.

At block 606, a user-replaceable mouse scrolls wheel may be mounted within the scroll wheel assembly cradle housed with the user-replaceable mouse bottom cover in an embodiment. For example, in an embodiment described with respect to FIG. 2E, a user-replaceable mouse scroll wheel 203a may be formed in an embodiment for mounting within and operative coupling to the scroll wheel assembly cradle 203b including an encoder operatively coupled to a main mouse PCB 240 within the user-replaceable wired or wireless mouse bottom cover 202. In another example embodiment described with reference to FIG. 3A, a user-replaceable mouse scroll wheel 303a may be disposed within the scroll wheel assembly cradle 303b of the user-replaceable wired or wireless mouse bottom cover 302.

In an embodiment at block 608, a user-replaceable wireless mouse bottom cover may be operatively coupled to the user-replaceable mouse battery. For example, in an embodiment described with reference to FIG. 2E employing a user-replaceable wireless mouse bottom cover 202, the user-replaceable wireless mouse bottom cover 202 may be operatively coupled to the user-replaceable mouse battery 241. For example, the user-replaceable mouse battery 241 may include one or more conductive traces that come into contact with one or more conductive traces of the mouse main PCB 240 upon fastening of the user-replaceable mouse battery 241 to the mouse main PCB 240. Such mounting may include snapping the user-replaceable mouse battery 241 into place within a plurality of releasable plastic tabs which the user may also bend outward in order to remove and replace the user-replaceable mouse battery 241. In another example embodiment described with reference to FIG. 3A, the user-replaceable wired or wireless mouse bottom cover 302 in an embodiment may include a mouse main PCB 340 that is operatively coupled to the user-replaceable mouse battery 341.

At block 610, a user-replaceable wired or wireless mouse bottom cover may be operatively coupled to the user-replaceable mouse top cover to form a user repairable and user-replaceable mouse. Such an operative coupling in an embodiment may involve contact being made between a user-replaceable mouse bottom cover magnetic bottom cover gasket and magnetic top cover gasket within the user-replaceable mouse top cover. For example, in an embodiment described with respect to FIGS. 2C, 2D, and 2E, a user-replaceable wired or wireless mouse bottom cover 202 may be operatively coupled to the user-replaceable mouse top cover 201 to form a user repairable and user-replaceable mouse 221. Such an operative coupling in an embodiment may involve contact being made between a user-replaceable mouse bottom cover 202 magnetic bottom cover gasket 208 and the magnetic top cover gasket 207 within the user-replaceable mouse top cover 201. The user-replaceable mouse top cover 201 may have mouse selection buttons or other buttons that are operatively coupled to button switches in the user-replaceable mouse 221 and operatively coupled to the mouse main PCB 240 and mouse controller in embodiments herein.

Thus, the user of a user-repairable and user-upgradeable may exchange various user-replaceable components without having to replace and dispose of the remaining, currently functional components with which the user is satisfied. In such a way, assembly of the user-repairable mouse may decrease waste associated with upgrading or replacing mice. The method for assembling a plurality of user-replaceable, modular components together to form a user-repairable mouse according to an embodiment of the present disclosure may then end.

The blocks of the flow diagram of FIGS. 5 and 6 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A user-repairable mouse for an information handling system comprising:
   a board-to-board connector comprising a first connector side on a sensor printed circuit board (PCB) bridged to a second connector side on a mouse main PCB, wherein the board-to-board connector is detachable for removal and replacement of the sensor PCB;
   a user-replaceable mouse bottom cover with releasable fastener and replaceable mouse sensor aperture, where the user replaceable mouse bottom cover is a surface interface during mouse operation;
   a user-replaceable mouse scroll wheel for operative coupling within a scroll wheel assembly cradle and to a scroll wheel encoder, wherein the scroll wheel assembly cradle and scroll wheel encoder are mounted to the mouse main PCB also including a mouse controller within the user-replaceable mouse bottom cover;
   a user-replaceable mouse sensor assembly inserted within the replaceable mouse sensor aperture of the user-replaceable mouse bottom cover, wherein
   the user-replaceable mouse sensor assembly includes an optical sensor operatively coupled to a sensor PCB;
   the sensor PCB includes the first connector side with contacts for removable coupling to the second connector side of the mouse main PCB via the board-to-board connector; and
   a user-replaceable mouse top cover operatively coupled with the user-replaceable mouse bottom cover to enclose the board-to-board connector, the mouse main PCB, the sensor PCB when inserted with the user replaceable mouse sensor assembly, and the user-replaceable mouse sensor assembly.

2. The user-repairable mouse of claim 1 further comprising:
   the mouse main PCB being operatively coupled to a user-replaceable mouse battery, and a mouse wireless adapter in the user-replaceable mouse bottom cover for establishing a wireless link with the information handling system.

3. The user-repairable mouse of claim 1 further comprising:
   the mouse main PCB being operatively coupled to a power and data connector in the user-replaceable mouse bottom cover for wired operative coupling to an information handling system.

4. The user-repairable mouse of claim 1 further comprising:
   a gliding foot operatively coupled to a sensor PCB holder on the user-replaceable mouse sensor assembly and having a surface-leveling spring to compress against the user-replaceable mouse bottom cover upon a user tilting the user-replaceable mouse bottom cover at angle with respect to a track surface during use, such that the sensor PCB holder and the gliding foot remain level with the track surface.

5. The user-repairable mouse of claim 1 further comprising:
   the user-replaceable mouse top cover operatively coupled with the user-replaceable mouse bottom cover via magnetic contact between a magnetic bottom cover gasket of the user-replaceable mouse bottom cover and a magnetic top cover gasket of the user-replaceable mouse top cover.

6. The user-repairable mouse of claim 1 further comprising:
   the user-replaceable mouse sensor assembly including an optical sensor lens disposed within a sensor PCB holder and operatively coupled to the optical sensor on the sensor PCB; and
   the user-replaceable mouse sensor assembly a gliding foot mounted beneath the sensor PCB holder.

7. The user-repairable mouse of claim 1, wherein the user-replaceable mouse sensor assembly is fastened to the user-replaceable mouse bottom cover via a mouse sensor assembly fastener such that it is removable and replaceable.

8. A method of assembling a user-repairable mouse for an information handling system comprising:
- operatively coupling a mouse main printed circuit board assembly (PCB) to a mouse controller, a user-replaceable mouse battery, and a mouse wireless adapter for establishing a wireless link with the information handling system;
- disposing the mouse main PCB having main board side connector contracts for a first connector side of a board-to-board connector within a user-replaceable wireless mouse bottom cover, where the user-replaceable wireless mouse bottom cover includes a replaceable mouse sensor aperture and serves as a surface interface during mouse operation;
- inserting a user-replaceable mouse sensor assembly within the replaceable mouse sensor aperture of the user-replaceable wireless mouse bottom cover having a sensor PCB with a second connector side of the board-to-board connector with sensor board side connector contacts on the sensor PCB to operatively couple the sensor PCB to the mouse main PCB via the board-to-board connector when the, where the user-replaceable mouse sensor assembly includes an optical sensor, the sensor PCB, an optical sensor lens, and a sensor PCB holder;
- fastening the user-replaceable mouse sensor assembly to the user-replaceable wireless mouse bottom cover, via a mouse sensor assembly fastener such that the user-replaceable mouse sensor assembly is removable and replaceable; and
- operatively coupling a user-replaceable mouse top cover with the user-replaceable wireless mouse bottom cover to enclose mouse main PCB, the board-to-board connector, and the user-replaceable mouse sensor assembly.

9. The method of claim 8 further comprising:
- operatively coupling a gliding foot to the sensor PCB holder of the user-replaceable mouse sensor assembly via a surface-leveling spring to compress against the user-replaceable wireless mouse bottom cover upon a user tilting the user-replaceable wireless mouse bottom cover at angle with respect to a track surface during use, such that the sensor PCB holder and the gliding foot remain level with the track surface.

10. The method of claim 8 further comprising:
- operatively coupling the user-replaceable mouse top cover with the user-replaceable wireless mouse bottom cover via magnetic contact between a magnetic bottom cover gasket of the user-replaceable mouse wireless bottom cover and a magnetic top cover gasket of the user-replaceable mouse top cover.

11. The method of claim 8 further comprising:
- disposing the optical sensor lens within the sensor PCB holder and under the optical sensor operatively coupled to the sensor PCB;
- mounting the sensor board side connector contacts on the sensor PCB; and
- operatively coupling the sensor PCB to the board-to-board connector via the sensor board side connector contacts on the sensor PCB upon inserting the user-replaceable mouse sensor assembly within the replaceable mouse sensor aperture.

12. The method of claim 8 further comprising:
- mounting a user-replaceable mouse scroll wheel within a scroll wheel assembly housed within the user-replaceable wireless mouse bottom cover.

13. The method of claim 8, wherein the mouse sensor assembly fastener is a sliding latch.

14. The method of claim 8, wherein the user-replaceable mouse top cover includes a top cover magnetic gasket to operatively coupling with a bottom cover magnetic gasket of the user-replaceable wireless mouse bottom cover.

15. A user-repairable mouse for an information handling system comprising:
- a board-to-board connector comprising a first connector side on a sensor printed circuit board (PCB) bridged to a second connector side on a mouse PCB via the board-to-board connector, wherein the board-to-board connector is detachable for removal and replacement of the sensor PCB;
- a user-replaceable mouse bottom cover having replaceable mouse sensor aperture and housing the mouse main PCB having a mouse controller, where the user replaceable mouse bottom cover is a surface interface during mouse operation;
- a user-replaceable mouse sensor assembly including a sensor PCB for disposition within the replaceable mouse sensor aperture of the user-replaceable wired mouse bottom cover, with a cursor movement sensor on the sensor PCB, wherein the sensor PCB having first connector side is coupled to the second connector side of the mouse main PCB, via the board-to-board connector;
- the user-replaceable mouse sensor assembly fastened to the user-replaceable wired mouse bottom cover, via a mouse sensor assembly fastener; and
- a user-replaceable mouse top cover operatively coupled with the user-replaceable wired mouse bottom cover to at least partially enclose the board-to-board connector, the user-replaceable mouse sensor assembly, and the user-replaceable mouse scroll wheel.

16. The user-repairable mouse of claim 15 further comprising:
- gliding foot operatively coupled to a sensor PCB holder of the user-replaceable mouse sensor assembly having a surface-leveling spring to compress against the user-replaceable mouse bottom cover upon a user tilting the user-replaceable mouse bottom cover at angle with respect to a track surface during use, such that the sensor PCB holder and the gliding foot remain level with a track surface.

17. The user-repairable mouse of claim 15, wherein the board-to-board connector forms a moveable floating coupling between the sensor PCB of the user replaceable mouse sensor assembly and the mouse main PCB.

18. The user-repairable mouse of claim 15 further comprising:
- the user-replaceable mouse top cover operatively coupled with the user-replaceable wired mouse bottom cover via magnetic contact between a magnetic bottom cover gasket of the user-replaceable mouse wired bottom cover and a magnetic top cover gasket of the user-replaceable mouse top cover.

19. The user-repairable mouse of claim 15 further comprising:
- the user-replaceable mouse top cover operatively coupled with the user-replaceable wired mouse bottom cover via magnetic contact between a magnetic bottom cover gasket of the user-replaceable mouse wired bottom cover and a magnetic top cover gasket of the user-replaceable mouse top cover.

20. The user-repairable mouse of claim 15 further comprising:

a user-replaceable mouse scroll wheel for mounting within a scroll wheel assembly cradle and operatively coupling to a scroll wheel encoder on the mouse main PCB housed within the user-replaceable wired mouse bottom cover.

* * * * *